(12) United States Patent
Nakashima et al.

(10) Patent No.: US 12,248,300 B2
(45) Date of Patent: Mar. 11, 2025

(54) PROGRAM GENERATION APPARATUS, PROGRAM GENERATION METHOD, AND COMPUTER-READABLE STORAGE MEDIUM STORING A GENERATION PROGRAM

(71) Applicant: OMRON Corporation, Kyoto (JP)

(72) Inventors: Chisato Nakashima, Kyoto (JP); Yoshiya Shibata, Kyoto (JP)

(73) Assignee: OMRON Corporation, Kyoto (JP)

( * ) Notice: Subject to any disclaimer, the term of this patent is extended or adjusted under 35 U.S.C. 154(b) by 289 days.

(21) Appl. No.: 17/788,503

(22) PCT Filed: Jan. 16, 2020

(86) PCT No.: PCT/JP2020/001244
§ 371 (c)(1),
(2) Date: Jun. 23, 2022

(87) PCT Pub. No.: WO2021/144911
PCT Pub. Date: Jul. 22, 2021

(65) Prior Publication Data
US 2023/0032261 A1    Feb. 2, 2023

(51) Int. Cl.
*G05B 19/4155*    (2006.01)
*B25J 9/16*    (2006.01)
*G06F 8/30*    (2018.01)

(52) U.S. Cl.
CPC ........ *G05B 19/4155* (2013.01); *B25J 9/1656* (2013.01); *G06F 8/30* (2013.01); *G05B 2219/40269* (2013.01)

(58) Field of Classification Search
CPC ....... G05B 19/4155; G05B 2219/40269; B25J 9/1656; G06F 8/30
See application file for complete search history.

(56) References Cited

U.S. PATENT DOCUMENTS

| | | | |
|---|---|---|---|
| 10,275,543 B1 * | 4/2019 | Edsinger | G06F 30/00 |
| 2003/0023341 A1 | 1/2003 | Sagawa et al. | |
| 2005/0021169 A1 | 1/2005 | Sagawa et al. | |
| 2005/0038552 A1 | 2/2005 | Sagawa et al. | |

(Continued)

FOREIGN PATENT DOCUMENTS

| | | |
|---|---|---|
| CN | 1394157 A | 1/2003 |
| CN | 101085523 A | 12/2007 |

(Continued)

OTHER PUBLICATIONS

Machine translation of JP2018051652, Fujimoto (Year: 2018).*

(Continued)

*Primary Examiner* — Ramon A. Mercado
*Assistant Examiner* — Mohamad O El Sayah
(74) *Attorney, Agent, or Firm* — METROLEX IP LAW GROUP, PLLC; Robert L Scott, Esq

(57) ABSTRACT

A program generation apparatus according to one or more embodiments may extract, from a series of motions defined in a motion program, a motion to be corrected based on a difference in attribute between a first component indicated as a target of a component change and a second component to replace the first component, and generate a new motion program by correcting a command value of the extracted motion to compensate for the difference in the attribute.

17 Claims, 8 Drawing Sheets

(56) References Cited

U.S. PATENT DOCUMENTS

| | | | |
|---|---|---|---|
| 2005/0107919 A1 | 5/2005 | Watanabe et al. | |
| 2007/0282485 A1 | 12/2007 | Nagatsuka et al. | |
| 2013/0040792 A1 | 2/2013 | Garate et al. | |
| 2013/0245823 A1* | 9/2013 | Kimura | B25J 9/1682 294/213 |
| 2016/0008976 A1 | 1/2016 | Nagatsuka et al. | |
| 2016/0089791 A1* | 3/2016 | Bradski | G06V 20/10 700/214 |
| 2016/0361817 A1 | 12/2016 | Hiruma et al. | |
| 2019/0270197 A1 | 9/2019 | Wagner et al. | |
| 2019/0315578 A1 | 10/2019 | Moriya et al. | |
| 2019/0329405 A1 | 10/2019 | Atohira | |
| 2020/0017317 A1* | 1/2020 | Yap | G06Q 10/08 |
| 2020/0233407 A1 | 7/2020 | Nagatani et al. | |
| 2021/0220993 A1* | 7/2021 | Zhao | B25J 9/1664 |
| 2022/0371195 A1* | 11/2022 | Lee | B25J 13/08 |

FOREIGN PATENT DOCUMENTS

| | | |
|---|---|---|
| CN | 105313120 A | 2/2016 |
| CN | 107430741 A | 12/2017 |
| CN | 110394780 A | 11/2019 |
| CN | 110461550 A | 11/2019 |
| JP | H7-036522 A | 2/1995 |
| JP | H11-070485 A | 3/1999 |
| JP | 2006-289580 A | 10/2006 |
| JP | 2006-350620 A | 12/2006 |
| JP | 2011-238041 A | 11/2011 |
| JP | 2015-182212 A | 10/2015 |
| JP | 2016-112645 A | 6/2016 |
| JP | 2017-004414 A | 1/2017 |
| JP | 2018-051652 A | 4/2018 |
| JP | 2018-083277 A | 5/2018 |
| JP | 2019-171501 A | 10/2019 |
| WO | 2018/123086 A1 | 7/2018 |

OTHER PUBLICATIONS

The office action (CNOA) issued on Dec. 13, 2023 in a counterpart Chinese patent application.

The extended European search report (EESR) issued on Mar. 28, 2023 in a counterpart European patent application.

An English translation of the International Search Report ("ISR") of PCT/JP2020/001244 mailed on Mar. 17, 2020.

The Written Opinion("WO") of PCT/JP2020/001244 mailed on Mar. 17, 2020.

* cited by examiner

PROGRAM GENERATION APPARATUS, PROGRAM GENERATION METHOD, AND COMPUTER-READABLE STORAGE MEDIUM STORING A GENERATION PROGRAM

FIELD

The present disclosure relates to a program generation apparatus, a program generation method, and a computer-readable storage medium storing a generation program.

BACKGROUND

Robot devices that perform operations such as assembling components have been developed for use at scenes for manufacturing products, such as on manufacturing lines. Teaching a series of motions in an assembly operation for assembling products to such robot devices typically includes providing target conditions such as initial positions (feeding positions) of components to be used in the assembly operation and their target states. Motion programs for causing the robot devices to perform an assembly operation are then generated using a variety of techniques such as direct manual operations on robot devices (direct teaching), teaching using a teaching pendant, and designing the motions of robot devices by, for example, programming.

Patent Literature 1 describes a method for teaching a series of motions in an assembly operation to a robot device. More specifically, the method described in Patent Literature 1 simulates the assembly state of a target product at the start of one assembly operation included in a series of assembly operations based on sequence data for the series of assembly operations in assembling the target product as well as based on three-dimensional (3D) data about each component, and derives teaching points for the robot to perform the assembly operations based on the simulated assembly state. The method described in Patent Literature 1 thus facilitates changes in the teaching points when the order of the series of assembly operations is changed afterward.

CITATION LIST

Patent Literature

Patent Literature 1: Japanese Unexamined Patent Application Publication No. 2018-083277

SUMMARY

The inventors have noticed issues associated with the known methods. At scenes involving a product assembly operation, some of multiple components used in the scenes may be changed although their order of assembly remains unchanged. This may occur when, for example, target components are out of stock, target components are no longer in production, the designs have been changed, different components are used for different purposes, target components are replaced with standardized products, or a motion program used for one product is to be used for an assembly operation for other products. For components being changed, the motions for the components before being changed may no longer be usable for the components after being changed, due to differences in attributes such as shape and dimensions between the components before and after such changes.

The operational details for the replacement components are to be changed accordingly. The operational details for any components that have dependency on the replacement components may also be changed accordingly as the states of the replacement components change in the products.

In an example, a product is assembled by stacking components on one another in sequence with a gripper. The order of assembly remains unchanged, but a component to be arranged in the middle of the structure is to be replaced with another component having different dimensions. In this example, an appropriate opening width of the gripper for gripping the replacement component may be changed. The placement position of a component to be placed on the replacement component is also to be changed within the product.

Thus, although the order of assembly remains unchanged, a change in any component used for the product can cause the details of at least some operations included in the assembly operations to be changed. A change in the operational details before and after the component change can cause a change in a command for a robot device to perform the operation appropriately. In the above example, the drive amount of the gripper is changed after the component change to allow appropriate gripping of the replacement component. To appropriately place a target component on the replacement component, the movement amount of the gripper for transporting the target component is changed.

Known methods cannot readily respond to a change in a motion resulting from such a component change. For every change in a component, a new motion program is to be generated for a robot device relevant to either the replacement component or another component having dependency on the replacement component to perform an assembly operation after the component change, by manually creating a motion of the robot device using the techniques listed above such as direct teaching. Such known methods thus involve, for every change in at least a component of a product, manually creating all motions affected by the component change and involve time- and labor-consuming generation of a new motion program usable for an assembly operation performed after the component change.

One or more embodiments are directed to a technique for reducing, for any change in at least one component included in a product, the time and labor to generate a new motion program usable in an assembly operation performed after a component change.

An apparatus, a method, and a program according to one or more embodiments have the structures described below.

A program generation apparatus according to one includes or more embodiments may include a data obtainer that obtains a motion program to instruct a robot device to perform a series of motions included in an assembly operation to assemble a product using a plurality of components, a change receiver that receives a request for a component change to change at least one of the plurality of components, a motion extractor that refers to attribute information indicating an attribute of each of the plurality of components, compares an attribute of a first component indicated as a target of the component change and an attribute of a second component to replace the first component in the component change, and extracts, from the series of motions defined in the motion program, a motion to be corrected based on a difference in attribute between the first component and the second component, and a command corrector that generates a new motion program to instruct the robot device to perform a series of motions included in an assembly operation performed after the component change by correcting a command value of the extracted motion in the motion program to compensate for the difference in attribute between the first component and the second component.

When the target component used in the product is changed from the first component to the second component and the first component and the second component have their attributes (e.g., shape, dimensions, and weight) matching fully, the product assembly operation may be performed appropriately with the same motions as used before the component change. A motion program is often to be corrected after a component change when the first component and the second component have different attributes. The program generation apparatus with this structure thus identifies any difference in attribute between the first component and the second component based on the attribute information and corrects the command value of any motion affected by the component change to compensate for the identified difference in attribute. This may allow automatic generation of a new motion program for appropriately assembling a product when the second component is used as a target component. The structure may reduce, for any change in at least one component included in the product, the time and labor to generate a new motion program usable in an assembly operation performed after a component change.

In the program generation apparatus according to the above aspect, the robot device may include a first tool usable in an operation associated with the first component included in the assembly operation. The program generation apparatus according to the above aspect may further include a specification determiner that refers to specification information indicating specifications of a plurality of tools including the first tool and determines whether a specification of the first tool responds to the component change from the first component to the second component.

When, for example, a gripper is used for an operation to transport a target component, the specifications of a target tool used in an operation associated with the first component may not fit the second component, such as the dimensions of the second component exceeding the maximum opening width of the gripper or the weight of the second component exceeding the weight capacity of the gripper. When the specifications of the target tool do not fit the second component, any corrected command value of an operation to compensate for a difference in attribute resulting from a component change cannot allow the target tool to perform an intended operation and thus cannot allow the product to be assembled appropriately. This structure may determine whether a motion failure is to occur due to the specifications of the target tool (first tool) for the component to be changed, thus may improve the reliability of the generated motion program.

The program generation apparatus according to one or more embodiments may further include a tool extractor that refers to the specification information and extracts, from the plurality of tools, a second tool of a same type as the first tool and having a specification to respond to the component change when the specification determiner determines that the specification of the first tool does not respond to the component change. This structure may automatically extract an appropriate tool for replacement (second tool) when a motion failure is to occur due to the specifications of a tool used for a target component to be changed, thus may reduce the time and labor to correct the generated motion program.

In the program generation apparatus according to one or more embodiments, the command corrector may generate a new motion program to instruct the robot device to perform a series of motions included in an assembly operation performed after the component change by correcting a command value of the extracted motion in the motion program to further compensate for a change from the first tool to the second tool. This structure may further reduce the time and labor to generate a new motion program usable in an assembly operation performed after a component change by automatically responding to the tool change.

In the program generation apparatus according to one or more embodiments, the attribute may include a shape, a dimension, and a position. The command value to be corrected may be associated with a geometric motion of the robot device. This structure may allow automatic generation of a new motion program responding to a change in the geometric attributes of the target component resulting from the replacement of the first component with the second component. This may reduce the time and labor to generate a new motion program usable in an assembly operation performed after a component change.

In the program generation apparatus according to the above aspect, the attribute information may include a geometric model for each of the plurality of components. The geometric model may represent a shape and a dimension being defined for each of the plurality of components in a local coordinate system having a reference point as an origin. The program generation apparatus according to the above aspect may further include an index determiner that determines whether a reference point of a geometric model for the first component and a reference point of a geometric model for the second component are defined using a same index, and a coordinate corrector that corrects the reference point of the geometric model for the second component to be defined using the same index as the reference point of the geometric model for the first component before the command value of the motion is corrected when the index determiner determines that the reference point of the first component and the reference point of the second component are not defined using the same index.

For example, the reference points of the geometric models may be defined using different indexes between two components when the geometric models are generated by different operators. When the reference points of the geometric models for the first component and the second component are defined using different indexes, simply replacing the target component from the first component with the second component causes the position of the second component to deviate from its intended position by a degree corresponding to the difference between the indexes used for the reference points. This may cause a failure in the motion of the robot device when a new motion program is generated and executed. This structure may allow the reference points of the geometric models for the first component and the second component to be defined using the same index when a new motion program is generated. This thus prevents a motion failure from occurring due to the different indexes used for the reference points of the geometric models when the new motion program is executed. The structure may reduce the time and labor to generate a new motion program usable in an assembly operation performed after a component change by automating the operation of adjusting the reference point of the geometric model for each component.

In the program generation apparatus according to one or more embodiments, the attribute may further include a weight. This structure may allow automatic generation of a new motion program responding to a change in the weight of the target component resulting from the replacement of the first component with the second component. This may reduce the time and labor to generate a new motion program usable in an assembly operation performed after a component change.

The program generation apparatus according to the above aspect may further include a simulator that simulates, using the generated new motion program, a series of motions of the robot device in an assembly operation to be performed after the component change. Factors (e.g., obstacles or interference with other objects) other than the different specifications of the above tools and different indexes for the reference points of the geometric models may cause a failure in the motion of the robot device when a new motion program is generated and executed. This structure simulates an assembly operation performed using a new motion program to determine whether a motion failure is to occur due to such other factors. This improves the reliability of the generated motion program.

In the program generation apparatus according to one or more embodiments, extracting the motion to be corrected may include identifying, among the plurality of components, a third component to be affected by the component change, identifying, among the series of motions, at least one motion associated with the first component or the third component being identified, and extracting, from the at least one motion being identified, a motion to be corrected based on a difference in attribute between the first component and the second component. This structure may appropriately extract a motion to be corrected based on a component change, and thus reduce the time and labor to generate a new motion program usable in an assembly operation performed after the component change.

Another implementation of the program generation apparatus according to the above aspects may be an information processing method, a program, or a storage medium storing the program readable by a computer for implementing the elements. The computer-readable storage medium includes a medium storing a program or other information in an electrical, magnetic, optical, mechanical, or chemical manner.

For example, a program generation method according to one or more embodiments is an information processing method implementable by a computer. The method includes obtaining a motion program to instruct a robot device to perform a series of motions included in an assembly operation to assemble a product using a plurality of components, receiving a request for a component change to change at least one of the plurality of components, referring to attribute information indicating an attribute of each of the plurality of components, comparing an attribute of a first component indicated as a target of the component change and an attribute of a second component to replace the first component in the component change, and extracting, from the series of motions defined in the motion program, a motion to be corrected based on a difference in attribute between the first component and the second component, and generating a new motion program to instruct the robot device to perform a series of motions included in an assembly operation performed after the component change by correcting a command value of the extracted motion in the motion program to compensate for the difference in attribute between the first component and the second component.

For example, a computer-readable storage medium storing a generation program according to one or more embodiments is a computer-readable storage medium storing a program for causing a computer to perform operations including obtaining a motion program to instruct a robot device to perform a series of motions included in an assembly operation to assemble a product using a plurality of components, receiving a request for a component change to change at least one of the plurality of components, referring to attribute information indicating an attribute of each of the plurality of components, comparing an attribute of a first component indicated as a target of the component change and an attribute of a second component to replace the first component in the component change, and extracting, from the series of motions defined in the motion program, a motion to be corrected based on a difference in attribute between the first component and the second component, and generating a new motion program to instruct the robot device to perform a series of motions included in an assembly operation performed after the component change by correcting a command value of the extracted motion in the motion program to compensate for the difference in attribute between the first component and the second component.

The technique according to one or more embodiments may reduce, for any change in at least one component included in a product, the time and labor to generate a new motion program usable in an assembly operation performed after a component change.

DETAILED DESCRIPTION

An embodiment of the present invention (hereafter, the present embodiment) will now be described with reference to the drawings. The present embodiment described below is a mere example of the present invention in all aspects. The embodiment may be variously modified or altered without departing from the scope of the present invention. More specifically, the present invention may be implemented as appropriate using the configuration specific to each embodiment. Although data used in the present embodiment is described in a natural language, such data may be specifically defined using any computer-readable language, such as a pseudo language, commands, parameters, or a machine language.

1. Example Use

Figure 1:
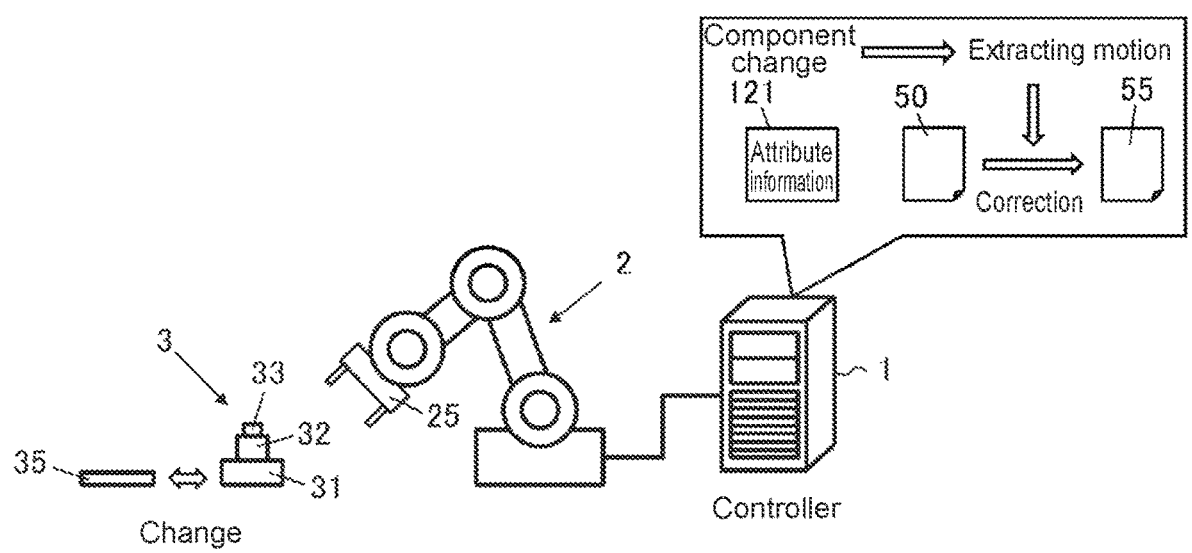
FIG. 1 is a schematic diagram illustrating an example situation in which one or more embodiments may be used.

FIG. 1 is a schematic diagram of an example situation in which an embodiment of the present invention is used. A controller 1 according to the present embodiment includes a computer that controls the motion of a robot device 2 in accordance with a motion program. An operation to be performed by the robot device 2 includes an assembly operation for assembling a product 3 using multiple components. The controller 1 according to the present embodiment further receives a request for a component change and generates a new motion program by correcting command values included in a motion program in response to the requested component change. The controller 1 according to the present embodiment is an example of a program generation apparatus.

The controller 1 first obtains a motion program 50 for instructing the robot device 2 to perform a series of motions included in an assembly operation to assemble the product 3 using multiple components. The controller 1 also receives a request for a component change to change at least one of the multiple components. The controller 1 then refers to attribute information 121 indicating the attributes of each component and compares the attributes of a first component indicated as a target of the component change and the attributes of a second component to replace the first component in the component change. Based on the comparison results, the controller 1 extracts, from the series of motions defined in the motion program 50, a motion to be corrected based on a difference in attribute between the first component and the second component. The controller 1 then generates a new motion program 55 to instruct the robot device 2 to perform a series of motions included in the assembly operation performed after the component change by correcting the command value of the extracted motion in the motion program 50 to compensate for the difference in attribute between the first component and the second component.

The robot device 2 may be of any type selected as appropriate in each embodiment. The robot device 2 may be one or more manipulators (industrial robots) selected from vertical articulated robots, horizontal articulated robots, selective compliance assembly robot arm (SCARA) robots, parallel link robots, Cartesian robots, and cooperative robots. The robot device 2 may include one or more tools for performing operations associated with the components. The tool(s) may include a first tool used for an operation associated with a first component included in an assembly operation. The tool(s) may be, for example, a gripper (robot hand), a suction device, a screw tightening device, and a soldering device. The operations associated with components include gripping, transporting, inserting, placing, pressing, repositioning, and aligning. A motion program includes a series of command values to instruct motions included in an assembly operation. Each command value may be defined as appropriate to drive the robot device 2. Each command value may include, for example, a target value of a control quantity or an operational quantity of a component (e.g., a tool or a joint) of the robot device 2 (e.g., a target position, an opening width, or a closing width of the gripper 25 described later).

The product 3 may be any object including multiple components and may be selected as appropriate in each embodiment. The product 3 may be, for example, any product that can be assembled on a production line, such as an electronic device, an electronic component, or an automotive component. The electronic component may be, for example, a substrate, a chip capacitor, a liquid crystal, or a relay coil. The automotive component may be, for example, a connecting rod, a shaft, an engine block, a power window switch, or a panel. The product may be a final product after completion of the manufacturing process or an intermediate product during the manufacturing process. The components may be selected as appropriate for each product. The components may be, for example, substrates, various chips, capacitors, connectors, pegs, sockets, holes, gears, bolts, screws, and nuts. The attributes of the components can affect the assembly operation. The attributes of the components include, for example, shape, dimensions, position, and weight.

In the example of FIG. 1, the product 3 includes three components 31 to 33, and the robot device 2 is a vertical articulated robot. The robot device 2 includes a gripper 25 as an end-effector to transport the components 31 to 33. An assembly operation of this product 3 is to stack the components 31 to 33 on one another in sequence. In the example of FIG. 1, a request for the product 3 for replacing the component 31 with the component 35 is received. The component 31 is an example of a first component. The component 35 is an example of a second component. The gripper 25 is an example of a first tool. The structure shown in FIG. 1 is a mere specific example for convenience of explanation. The structure of the robot device 2 and the structure of the product 3 as well as the procedure for the assembly operation may be determined as appropriate in each embodiment. The number of components included in the product 3 may be selected as appropriate in each embodiment. A component to be a target of a component change may be selected as appropriate from the multiple components included in the product 3.

Figure 2A:
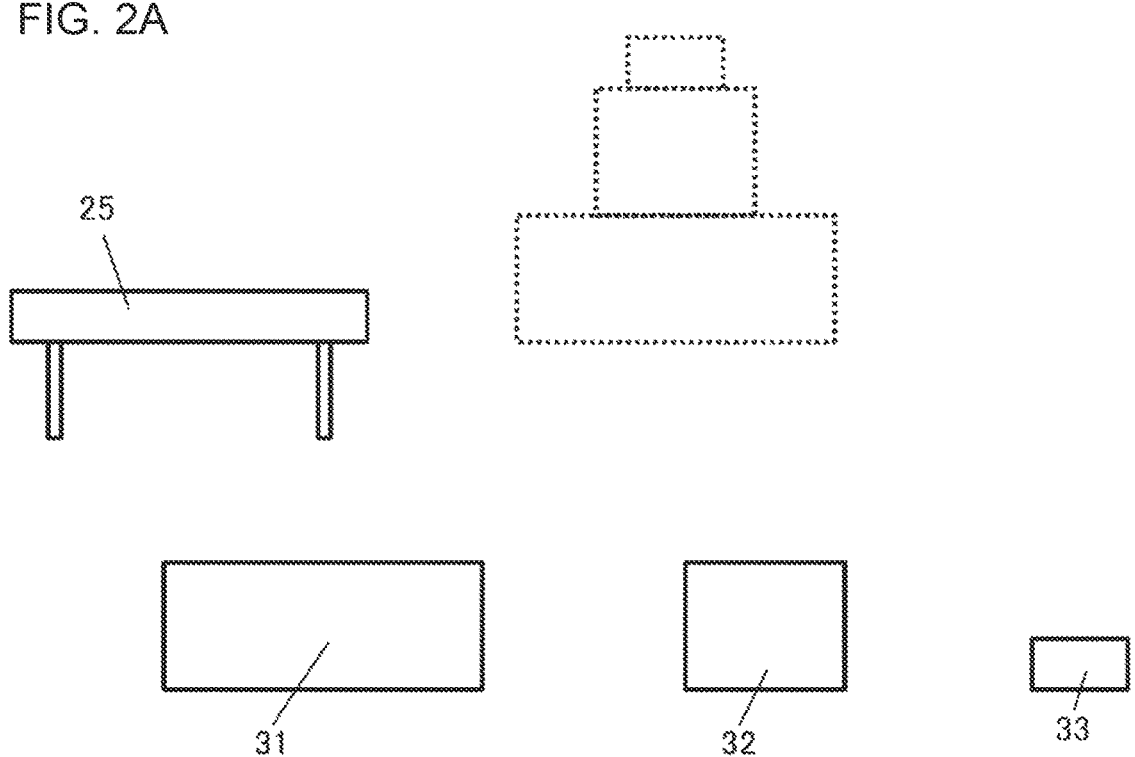
FIG. 2A is a schematic diagram illustrating an example procedure for an assembly operation before a component change, performed by a robot device in one or more embodiments.

FIGS. 2A to 2D schematically show an example procedure for an operation of assembling the product 3 before a component change. As shown in FIG. 2A, the components 31 to 33 are placed at different feeding positions in an initial state. An example assembly operation includes three processes.

Figure 2B:
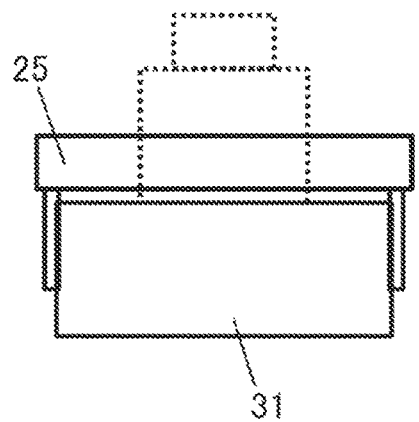
FIG. 2B is a schematic diagram illustrating an example procedure for an assembly operation before a component change, performed by the robot device in one or more embodiments.
Figure 2B:
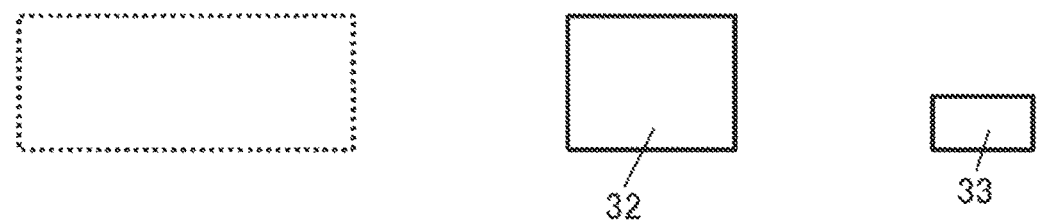

The first process is to place the component 31 at its target position in its target orientation. The controller 1 first causes the robot device 2 to move the gripper 25 to the feeding position of the component 31. The controller 1 then causes the robot device 2 to open and close the gripper 25 to grip the component 31. As shown in FIG. 2B, the controller 1 causes the robot device 2 to transport the gripped component 31 to the target position. The controller 1 then causes the robot device 2 to open the gripper 25 and place the component 31 at the target position in the target orientation. This ends the first process.

Figure 2C:
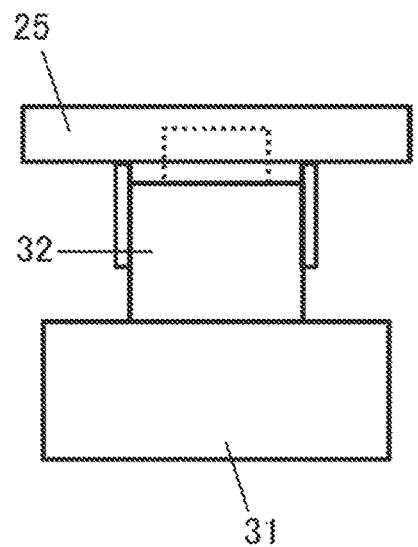
FIG. 2C is a schematic diagram illustrating an example procedure for an assembly operation before a component change, performed by a robot device in one or more embodiments.
Figure 2C:
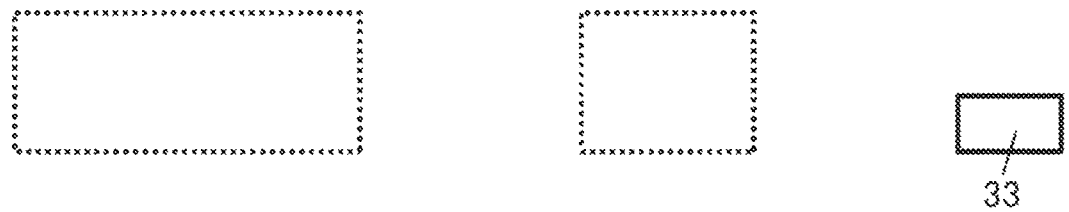

The second process is to place the component 32 at the target position on the component 31 in the target orientation. The controller 1 first causes the robot device 2 to move the gripper 25 to the feeding position of the component 32. The controller 1 then causes the robot device 2 to open and close the gripper 25 to grip the component 32. As shown in FIG. 2C, the controller 1 causes the robot device 2 to transport the gripped component 32 to a target position on the component 31. The controller 1 then causes the robot device 2 to open the gripper 25 and place the component 32 at the target position on the component 31 in the target orientation. This ends the second process.

Figure 2D:
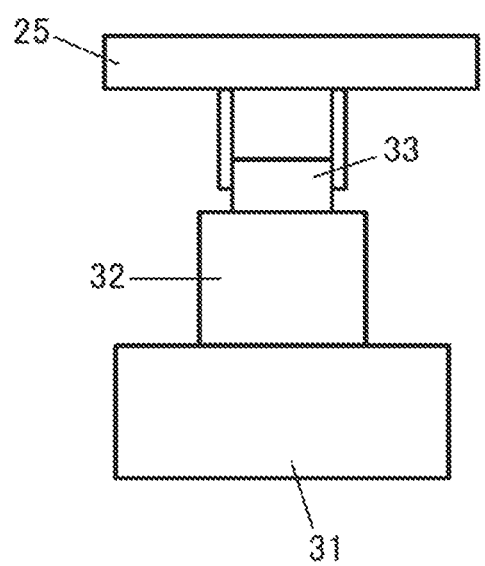
FIG. 2D is a schematic diagram illustrating an example procedure for an assembly operation before a component change, performed by a robot device in one or more embodiments.
Figure 2D:

The third process is to place the component 33 at a target position on the component 32 in a target orientation. The controller 1 first causes the robot device 2 to move the gripper 25 to the feeding position of the component 33. The controller 1 then causes the robot device 2 to open and close the gripper 25 to grip the component 33. As shown in FIG. 2D, the controller 1 causes the robot device 2 to transport the gripped component 33 to the target position on the component 32. The controller 1 then causes the robot device 2 to open the gripper 25 and place the component 33 at the target position on the component 32 in the target orientation. This ends the third process to complete the assembly of the product 3.

An example of the motion program 50 includes a series of command values defined to instruct motions of the robot device 2 in the above processes such as the target position, the opening width, and the closing width of the gripper 25. An example of the motion program 50 may be generated as appropriate by, for example, direct teaching, manual designing (teaching using, for example, a teaching pendant or programming), or automatic planning (e.g., motion planning).

Figure 3A:
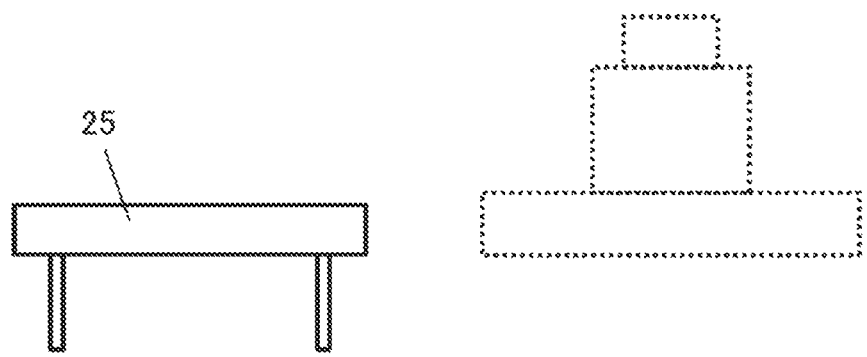
FIG. 3A is a schematic diagram illustrating an example procedure for an assembly operation after a component change, performed by a robot device in one or more embodiments.
Figure 3A:
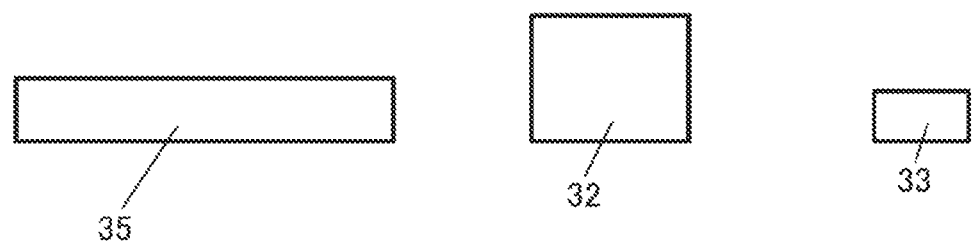
Figure 3B:
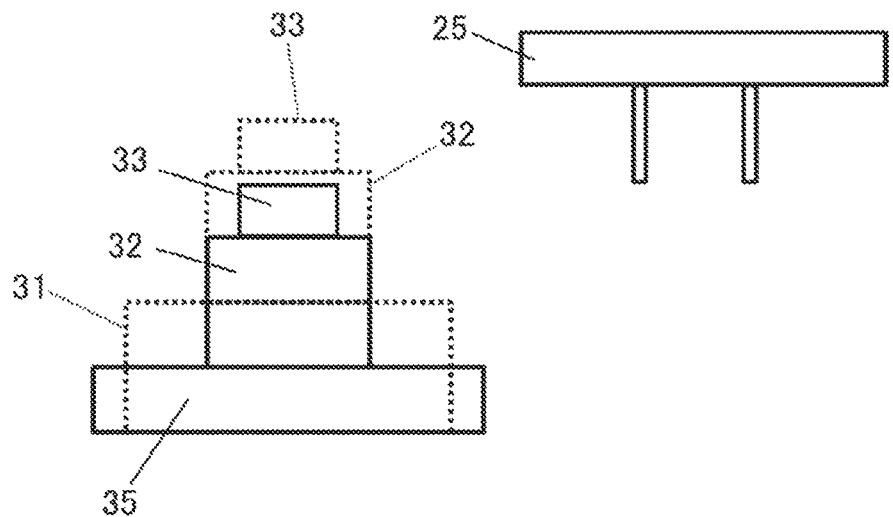
FIG. 3B is a schematic diagram illustrating an example procedure for an assembly operation after a component change, performed by a robot device in one or more embodiments.

FIG. 3A schematically shows an example procedure for the operation of assembling the product 3 in an initial state after a component change. FIG. 3B schematically shows the product 3 in a finished state after the component change (in other words, upon completion of the assembly operation). In an example component change involving a change in attribute of a target component as shown in FIGS. 3A and 3B, a replacement component 35 has dimensions different from the dimensions of a component 31 used before the component change. For example different dimensions, the component 35 is wider than and less tall than the component 31. The feeding position of the component 35 may be the same as or different from the feeding position of the component 31.

In this example, the process sequence in the assembly operation of the product 3 remain the same before and after the component change. The controller 1 causes the robot device 2 to perform motions corresponding to the first to third processes, or specifically, transport the components 35, 32, and 33 in sequence to their target positions. This completes the assembly operation of the product 3 as shown in FIG. 3B.

However, the gripper 25 in the robot device 2 driven in the same manner as before the component change cannot perform the assembly operation of the product 3 appropriately due to the dimensions of the component 35 different from the dimensions of the component 31. For example, the component 35 is wider than the component 31. The gripper 25 with the opening width intended for gripping the component 31 cannot grip the component 35. Through the above information processing, the controller 1 corrects the command values in the motion program 50 to respond to the component change and thus generates a new motion program 55 that can perform the operation of assembling the product 3 after the component change.

After obtaining the motion program 50 and then receiving a request for the component change, the controller 1 refers to the attribute information 121 and compares the attributes of the component 31 with the attributes of the component 35. The comparison allows the controller 1 to obtain the dimensional differences between the component 31 and the component 35. Based on this, the controller 1 extracts, from the series of motions defined in the motion program 50, a motion to be corrected.

A motion to be corrected may simply be a motion associated with the first component to be replaced with the second component. However, the component change can also affect a component having dependency on the first component, such as a component with its placement position determined by the first component. In the above specific example, two components (32, 33) are placed on the component 31 to be changed and are thus affected by the component change. A motion to be corrected may include a motion associated with any component having dependency on the first component, in addition to a motion associated with the first component. Extracting a motion to be corrected may thus include identifying, among multiple components, a third component that is affected by the component change, identifying, among a series of motions, one or more motions associated with the first component or with the identified third component, and extracting, from the identified motion(s), a motion to be corrected based on a difference in attribute between the first component and the second component. Each of the components (32, 33) is an example of a third component. This allows appropriate extraction of any motion to be corrected based on a component change.

In the above specific example, an example motion extracted from motions associated with the component 31 through this process as a motion to be corrected may be a motion of gripping the component 31 with the gripper 25 and a motion of transporting the component 31 to its target position with the gripper 25. When the feeding position of the component 35 is different from the feeding position of the component 31, an extracted example motion to be corrected may be a motion of moving the gripper 25 to the feeding position of the component 31. An example motion to be corrected that is extracted from motions associated with the components (32, 33) may be a motion of transporting each component (32, 33) to its target position with the gripper 25.

The controller 1 then corrects the command value of the extracted motion in the motion program 50 to compensate for the dimensional differences between the component 31 and the component 35. As specific example command values to be corrected, the opening width and the closing width of the gripper 25 defined to grip the component 31 may be corrected to larger values to grip the component 35. The target position of the gripper 25 defined to transport the component 31 to its target position may be corrected to a smaller value for the component 35 that is less tall than the component 31. The opening width of the gripper 25 defined to release the component 31 at the target position may be corrected to a larger value to release the component 35. When the feeding position of the component 35 is different from the feeding position of the component 31, the target position of the gripper 25 defined to move to the feeding position of the component 31 may be corrected to match the feeding position of the component 35. The target position of the gripper 25 defined to transport each component (32, 33) to its target position may be corrected to a smaller value for the component 35 that is less tall than the component 31.

Each correction value may be determined in accordance with a difference in attribute between the first component and the second component. The rule for the correction may be determined as appropriate. For example, a difference in attribute value between the first component and the second component may be used directly as a correction value. In the above specific example, a difference in dimension between the component 31 and the component 35 may be used directly as a correction value. For example, each correction value may be derived from a difference in attribute value between the first component and the second component in accordance with a predetermined rule. This allows generation of a new motion program 55.

As described above, the controller 1 according to the present embodiment can automatically generate a new motion program 55 by correcting command values included in the motion program 50 in response to a request for a component change. The generated new motion program 55 includes command values of motions that are affected by the component change corrected through the above process to match the attributes of the replacement second component (the component 35 in the above specific example). The generated new motion program 55 thus allows the assembly operation of the product 3 to be performed appropriately after the component change from the first component to the second component. The structure according to the present embodiment reduces, for any change in at least one component included in the product 3, the time and labor to generate a new motion program 55 usable in an assembly operation performed after the component change.

Further, generating a new motion program in response to a component change previously involves a skilled person with much knowledge about the motion of the robot device and each component. The controller 1 according to the present embodiment can automatically generate, in response to a request for a component change, a new motion program 55 usable in an assembly operation performed after the component change. The controller 1 according to the present embodiment allows a relatively inexperienced person to generate a new motion program in response to a component change.

2. Example Structure

Hardware Configuration

Controller

Figure 4:
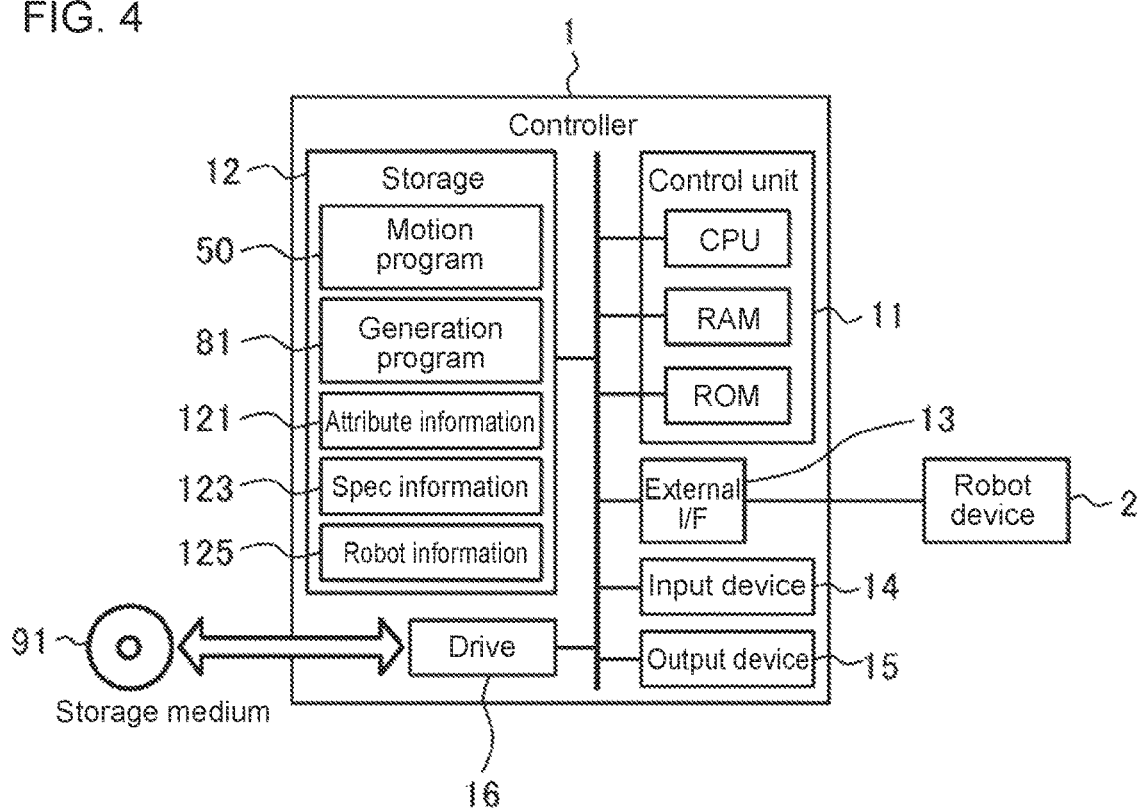
FIG. 4 is a schematic diagram illustrating a controller according to one or more embodiments showing a hardware configuration.

FIG. 4 is a schematic diagram of the controller 1 according to the present embodiment showing its hardware configuration. As shown in FIG. 4, the controller 1 according to the present embodiment is a computer including a control unit 11, a storage 12, an external interface 13, an input device 14, an output device 15, and a drive 16 that are electrically connected to one another. In FIG. 4, the external interface is abbreviated as an external I/F.

The control unit 11 includes, for example, a central processing unit (CPU) as a hardware processor, a random-access memory (RAM), and a read-only memory (ROM). The control unit 11 performs information processing based on programs and various items of data. The storage 12, as an example of a memory, includes, for example, a hard disk drive or a solid-state drive. In the present embodiment, the storage 12 stores various sets of information including the motion program 50, a generation program 81, the attribute information 121, specification information 123, and robot information 125.

As described above, the motion program 50 includes a series of command values for instructing the robot device 2 to perform a series of motions included in an assembly operation to assemble the product 3 using multiple components. The generation program 81 causes the controller 1 to perform information processing (described below referring to FIGS. 8A and 8B) for generating a new motion program 55 in response to a request for a component change. The generation program 81 includes a series of commands for the information processing. The attribute information 121 includes information about the attributes of the components to be used in the product 3. The components to be used in the product 3 include the above components (31 to 33 and 35). The attribute information 121 may include information about the shape, dimensions, and position (in other words, geometric attributes) of each component. The position of each component includes, for example, the above feeding position. The geometric attributes may further include the orientations (e.g., roll, pitch, and yaw) of each component. The attribute information 121 may further include information about the weight (in other words, attributes other than the geometric attributes) of each component. The specification information 123 includes information about the specifications of each tool attachable to the robot device 2. The specifications of each tool refer to the capability to perform an operation. The specifications include the maximum opening width of the gripper. The specifications indicated by the specification information 123 may be selected as appropriate for the type of tool. The tools attachable to the robot device 2 include the gripper 25 described above. The robot information 125 includes information about the specifications of the robot device 2. This will be described in detail later.

The external interface 13 is an interface for connection to an external device and may be, for example, a universal serial bus (USB) port or a dedicated port. The type and the number of external interfaces 13 may be selected as appropriate for the type and the number of external devices to be connected. In the present embodiment, the controller 1 is connected to the robot device 2 through the external interface 13. The controller 1 can thus control the motion of the robot device 2.

However, the configuration for controlling the motion of the robot device 2 may be any configuration other than the above example and may be determined as appropriate in each embodiment. For the controller 1 and the robot device 2 including a communication interface, for example, the controller 1 may be connected to the robot device 2 through the communication interface. For the robot device 2 connected to another information processor (e.g., another controller), the controller 1 may be connected to the robot device 2 through the other information processor.

The input device 14 is, for example, a mouse and a keyboard. The output device 15 is, for example, a display and a speaker. An operator may operate the controller 1 using the input device 14 and the output device 15.

The drive 16 is, for example, a compact disc (CD) drive or a digital versatile disc (DVD) drive for reading programs or other information stored in a storage medium 91. The storage medium 91 stores programs or other information in an electrical, magnetic, optical, mechanical, or chemical manner to allow a computer or another device or machine to read the stored programs or other information.

At least one of the motion program 50, the generation program 81, the attribute information 121, the specification information 123, or the robot information 125 may be stored in the storage medium 91. The controller 1 may obtain at least one of the motion program 50, the generation program

81, the attribute information 121, the specification information 123, or the robot information 125 from the storage medium 91.

In FIG. 4, the storage medium 91 is a disc storage, such as a CD or a DVD. However, the storage medium 91 is not limited to a disc storage. An example of the storage medium other than a disc storage is a semiconductor memory such as a flash memory. The drive 16 may be of any type selected as appropriate for the type of storage medium 91.

For the specific hardware configuration of the controller 1, components may be eliminated, substituted, or added as appropriate in each embodiment. For example, the control unit 11 may include multiple hardware processors. Each hardware processor may include a microprocessor, a field-programmable gate array (FPGA), a digital signal processor (DSP), or other processors. The storage 12 may be the RAM and the ROM included in the control unit 11. At least one of the external interface 13, the input device 14, the output device 15, or the drive 16 may be eliminated. The controller 1 may include a communication interface for data communication with another information processing device. The controller 1 may include multiple computers. In this case, each computer may have the same or a different hardware configuration. The controller 1 may be an information processing apparatus dedicated to an intended service, or may be a general-purpose personal computer (PC) such as a desktop PC or a tablet PC, or a programmable logic controller (PLC).

Robot Device

Figure 5:
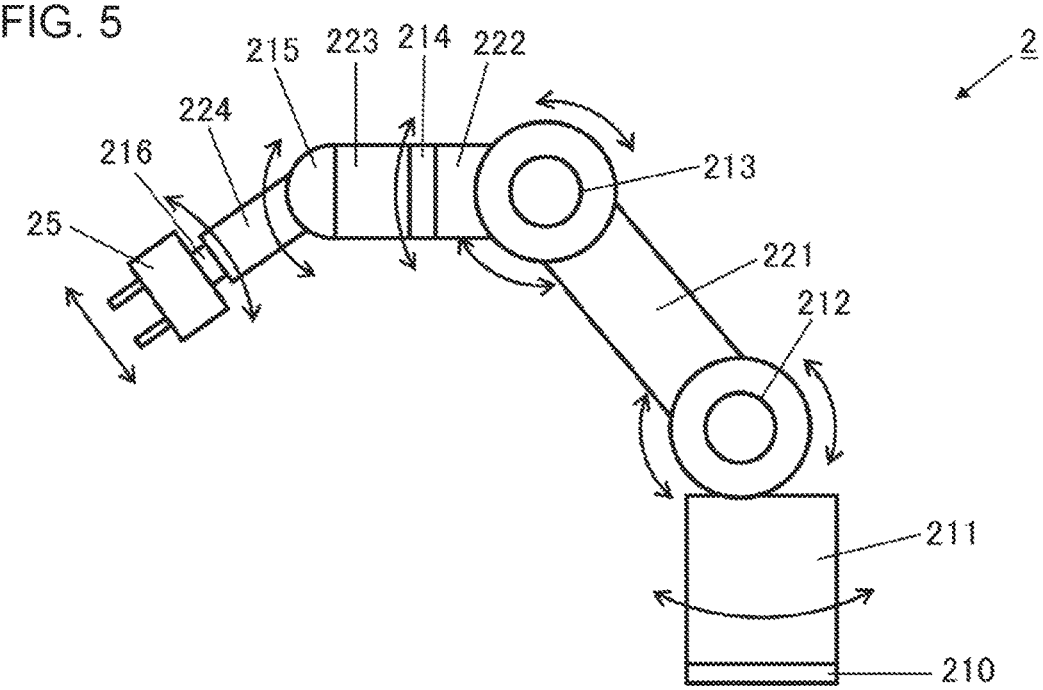
FIG. 5 is a schematic diagram illustrating an example robot device in one or more embodiments.

FIG. 5 is a schematic diagram of the robot device 2 according to the present embodiment showing its hardware configuration.

The robot device 2 in the present embodiment is a vertically articulated six-axis industrial robot with a base 210 and six joints 211 to 216. Each of the joints 211 to 216 incorporates a servomotor (not shown) and is rotatable about its axis. The first joint 211 is connected to the base 210 and has its distal end rotatable about the axis of the base. The second joint 212 is connected to the first joint 211 and has its distal end rotatable in the back-and-forth direction. The third joint 213 is connected to the second joint 212 with a link 221 and has its distal end rotatable vertically. The fourth joint 214 is connected to the third joint 213 with a link 222 and has its distal end rotatable about the axis of the link 222. The fifth joint 215 is connected to the fourth joint 214 with a link 223 and has its distal end rotatable vertically. The sixth joint 216 is connected to the fifth joint 215 with a link 224 and has its distal end rotatable about the axis of the link 224. The sixth joint 216 has its distal end receiving the gripper 25 as an end-effector.

Each of the joints 211 to 216 further incorporates an encoder (not shown). The encoder measures the angle of the corresponding one of the joints 211 to 216. The encoder may be of any type selected as appropriate in each embodiment. The measurement values from the encoder are used to control the angle of each of the joints 211 to 216. The angle of each of the joints 211 to 216 may be controlled with any method selected as appropriate in each embodiment. The joints 211 to 216 may be controlled with a known method such as proportional-integral-derivative (PID) control or PI control. The transformation between the angle of each of the joints 211 to 216 and the position of the gripper 25 may be performed based on forward kinematics and inverse kinematics. A command value used for moving the gripper 25 as an example control method may be defined by the target position of the gripper 25. In this case, the target position of the gripper 25 may be converted into the target angle of each of the joints 211 to 216 based on inverse kinematics. The drive amount of each of the joints 211 to 216 may then be determined based on the difference between the target angle of each of the joints 211 to 216 and the current angle measured by the encoder.

The robot device 2 may have the hardware configuration different from the structure in the example. For the specific hardware configuration of the robot device 2, components may be eliminated, substituted, or added as appropriate in each embodiment. For example, the robot device 2 may include a sensor other than the encoder to measure the control quantity or other attributes. The robot device 2 may further include, for example, at least one of a vision sensor (e.g., a camera) or a tactile sensor. Sensing data obtained from the sensor may be used in feedback control of the robot device 2. For example, the motion of the robot device 2 may be controlled not to apply an excessive force to the gripper 25 based on sensing data obtained from a tactile sensor. For example, the motion of the robot device 2 may be controlled to move the gripper 25 to an intended position (e.g., to a position to grip each component) based on sensing data obtained from the vision sensor. The robot device 2 may have another number of axes other than six axes selected as appropriate in each embodiment. The robot device 2 may be a known industrial robot.

Software Configuration

Figure 6:
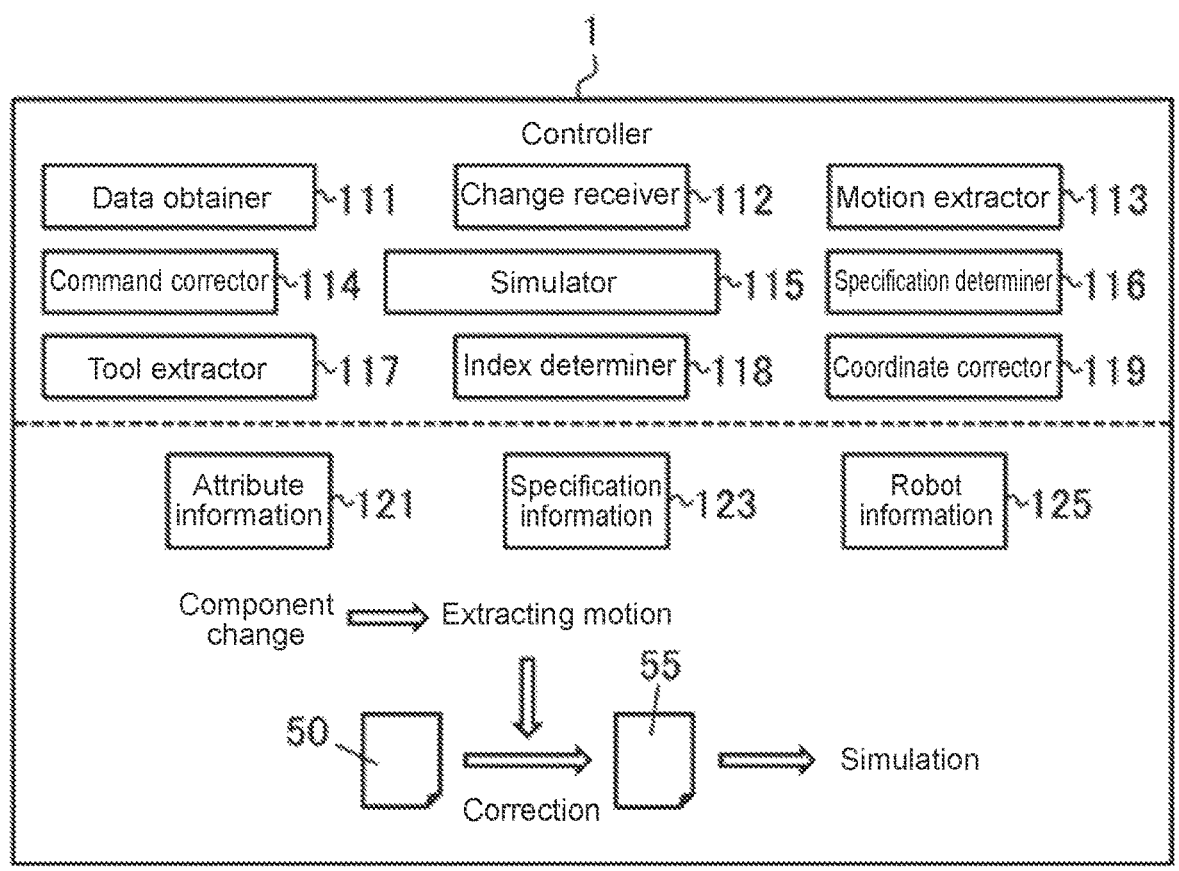
FIG. 6 is a schematic diagram illustrating controller according to one or more embodiments showing a software configuration.

FIG. 6 is a schematic diagram of the controller 1 according to the present embodiment showing its example software configuration associated with the information processing for generating a program.

The control unit 11 in the controller 1 loads the generation program 81 stored in the storage 12 into the RAM. The CPU in the control unit 11 then interprets and executes a command included in the generation program 81 loaded in the RAM to control each unit. The controller 1 according to the present embodiment thus operates as a computer including a data obtainer 111, a change receiver 112, a motion extractor 113, a command corrector 114, a simulator 115, a specification determiner 116, a tool extractor 117, an index determiner 118, and a coordinate corrector 119 as software modules as shown in FIG. 6. In the present embodiment, each software module in the controller 1 associated with the information processing for generating a program is implemented by the control unit 11 (CPU).

The data obtainer 111 obtains a motion program 50 for instructing the robot device 2 to perform a series of motions included in an assembly operation to assemble the product 3 using multiple components. The change receiver 112 receives a request for a component change to change at least one of the multiple components. The motion extractor 113 refers to the attribute information 121, compares the attributes of the first component indicated as a target of the component change with the attributes of the second component to replace the first component in the component change, and extracts, from the series of motions defined in the motion program 50, any motion to be corrected based on the difference in attribute between the first component and the second component. The command corrector 114 then generates a new motion program 55 to instruct the robot device 2 to perform a series of motions included in the assembly operation after the component change by correcting the command value of any extracted motion in the motion program 50 to compensate for the difference in attribute between the first component and the second component.

The simulator 115 uses the generated new motion program 55 to simulate a series of motions of the robot device 2 in the assembly operation to be performed after the component change. The specification determiner 116 refers to the specification information 123 and determines whether the specifications of the first tool can respond to the component change from the first component to the second component. When the specification determiner 116 determines that the specifications of the first tool cannot respond to the component change, the tool extractor 117 refers to the specification information 123. The tool extractor 117 extracts, from multiple tools indicated by the specification information 123, a second tool of the same type as the first tool and having the specifications that can respond to the component change. The command corrector 114 then generates a new motion program 55 to instruct the robot device 2 to perform a series of motions included in the assembly operation after the component change by correcting the command value of the extracted motion in the motion program 50 to further compensate for the change from the first tool to the second tool.

To simulate the real space in the virtual space, the attribute information 121 may include the geometric models for the components to be used in the product 3. The specification information 123 may include information about the geometric model for each tool attachable to the robot device 2. The robot information 125 may include the geometric model for the robot device 2. A geometric model represents the shape and dimensions of each object (a component, a tool, or the robot device 2) in the local coordinate system defined for the corresponding object and having a reference point as the origin. Such geometric models may include computer-aided design (CAD) data, or may be generated with known software. To determine the operating state in the real space for the above simulation or other purposes, the controller 1 may create a virtual space that can project the operating state in the real space based on the attribute information 121, the specification information 123, and the robot information 125. The operating state may be represented by, for example, the current positions of each component (31 to 33 and 35) and the gripper 25. The virtual space may be created using known software.

Figure 7:
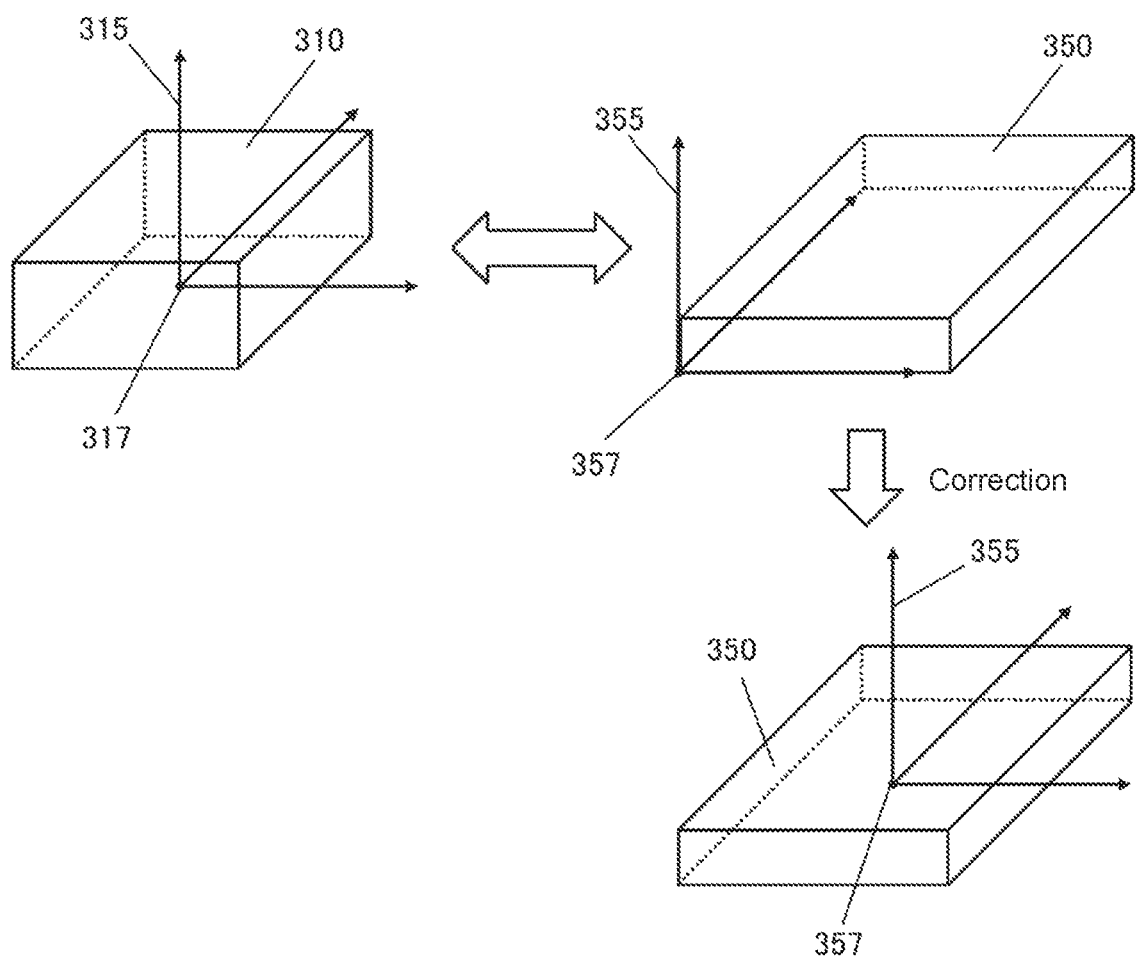
FIG. 7 is a schematic diagram illustrating a geometric model for each component in one or more embodiments.

FIG. 7 is a schematic diagram of an example geometric model (310, 350) for each component (31, 35). Each geometric model (310, 350) represents the shape and the dimensions of the corresponding component (31, 35) in the local coordinate system (315, 355) defined for the corresponding component (31, 35) and having a reference point (317, 357) as the origin. In the example of FIG. 7, the reference point 317 of the geometric model 310 representing the component 31 is at the center of the component 31. The reference point 357 of the geometric model 350 representing the component 35 is at a corner (the front left corner in the figure) of the component 35. In this manner, the reference points of the geometric models for multiple components may be defined using different indexes. This results from, for example, the geometric models being generated by different operators. When the component 31 is replaced with the component 35 in this state, the position of the component 35 may deviate from its intended position in the virtual space by a degree corresponding to the difference between the indexes used for the reference points. This may cause a failure in any motion of the robot device 2 associated with the component 35 when the new motion program 55 is generated and executed.

The index determiner 118 thus determines whether the reference point of the geometric model for the first component and the reference point of the geometric model for the second component are defined using the same index. When the index determiner 118 determines that the reference points for the first component and the second component are not defined using the same index, the coordinate corrector 119 corrects the reference point of the geometric model for the second component to be defined using the same index as the reference point of the geometric model for the first component before the process to correct the command value of the above motion is performed. In the example of FIG. 7, the reference point 317 for the component 31 is at the center of the component 31, whereas the reference point 357 for the component 35 is at one corner of the component 35. The index determiner 118 determines that the reference point 317 for the component 31 and the reference point 357 for the component 35 are not defined using the same index. The coordinate corrector 119 corrects the reference point 357 for the component 35 to be defined using the same index as the reference point 317 for the component 31. As an example of correction shown in FIG. 7, the coordinate corrector 119 corrects the position of the reference point 357 to be the center of the component 35. When the local coordinate system 355 for the component 35 has a different inclination from the local coordinate system 315 for the component 31, correcting the reference point 357 includes correcting the inclination of the local coordinate system 355 to match the inclination of the local coordinate system 315.

Each software module in the controller 1 will be described in detail in operation examples described below. In the present embodiment, each software module in the controller 1 is implemented by a general-purpose CPU. However, some or all of the software modules may be implemented by one or more dedicated processors. For the software configuration of the controller 1, software modules may be eliminated, substituted, or added as appropriate in each embodiment.

3. Operation Examples

Figure 8A:
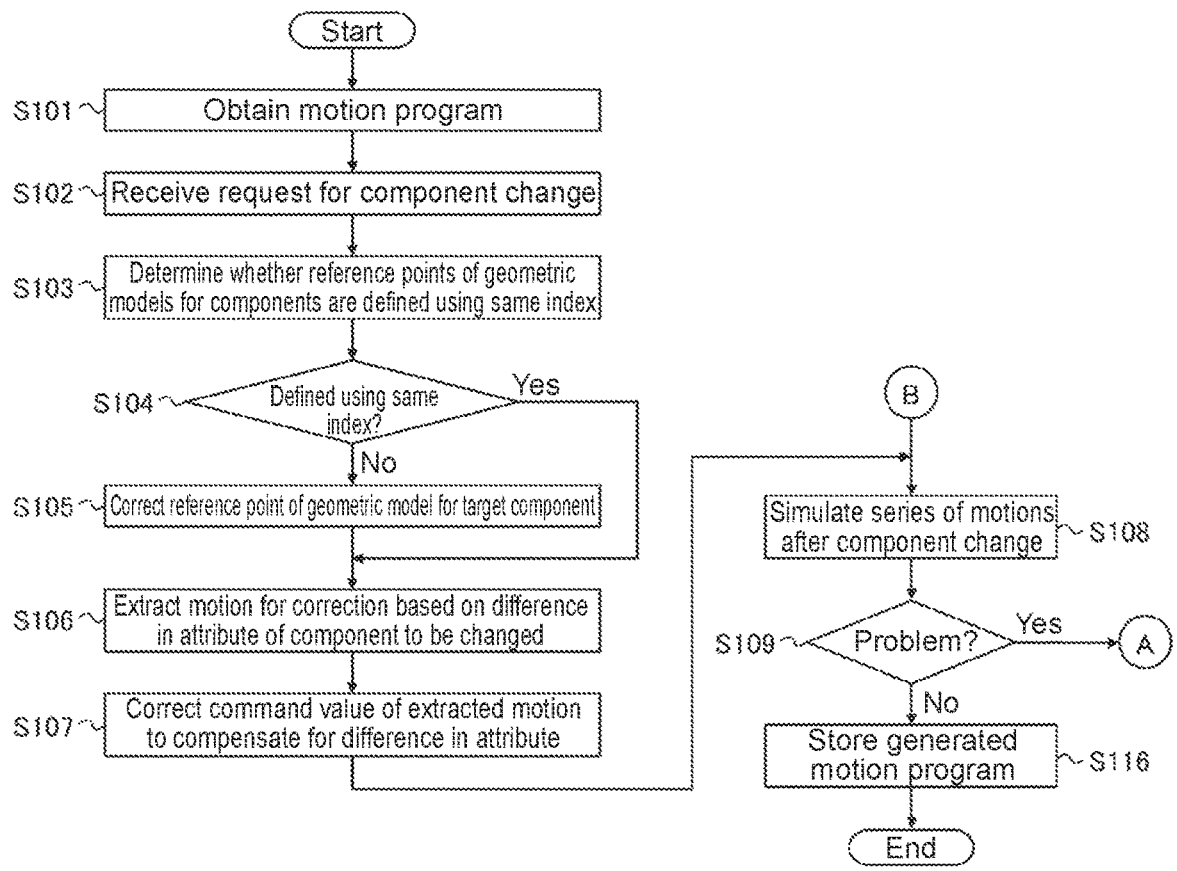
FIG. 8A is a flowchart illustrating an example procedure for generating a motion program using a controller according to one or more embodiments.
Figure 8B:
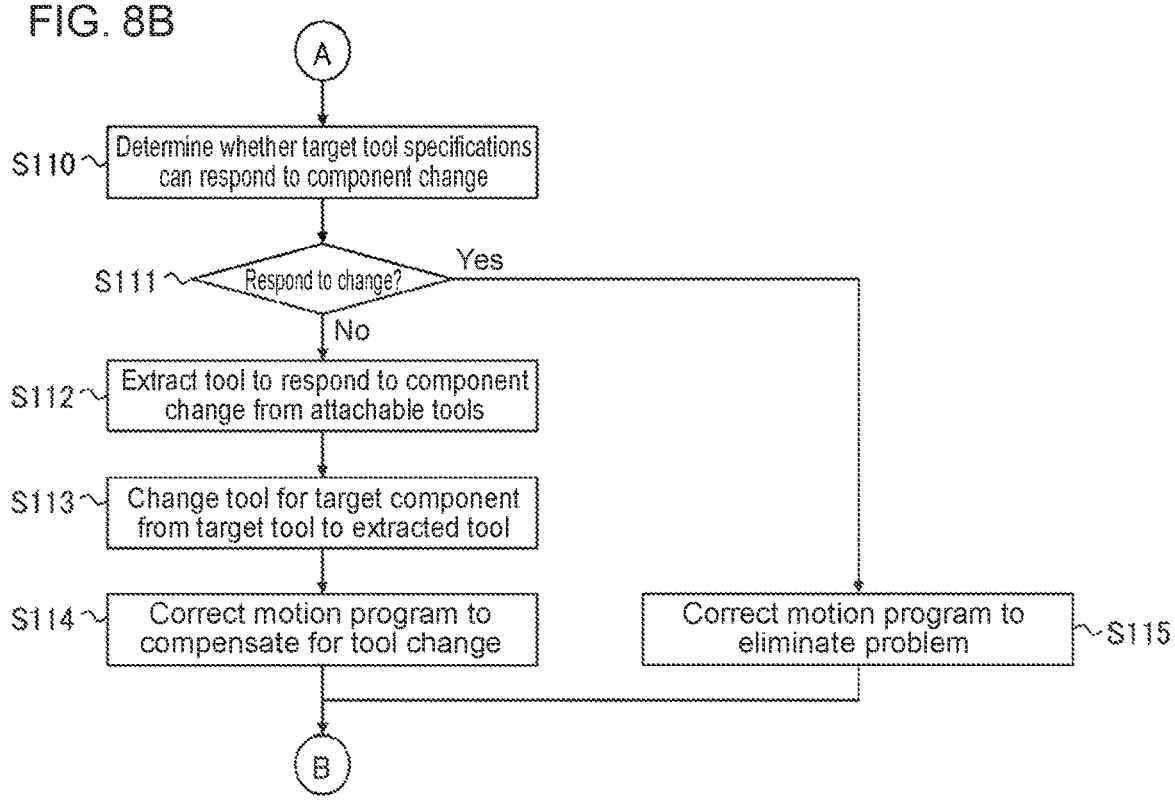
FIG. 8B is a flowchart illustrating an example procedure for generating a motion program using a controller according to one or more embodiments.

FIGS. 8A and 8B are flowcharts of an example procedure performed by the controller 1 according to the present embodiment. The procedure described below is an example of a program generation method. The procedure described below is a mere example, and each of its steps may be modified in any possible manner. In the procedure described below, steps may be eliminated, substituted, or added as appropriate in each embodiment.

Step S101

In step S101, the control unit 11 operates as the data obtainer 111 to obtain the motion program 50.

In the present embodiment, the control unit 11 obtains the motion program 50 from the storage 12. The motion program 50 may be obtained from any source other than the storage. The motion program 50 may be stored in another storage area, such as an external storage device or a storage medium. The external storage may be, for example, a data server such as a network attached storage (NAS), or an external storage device connected to the controller 1. In this case, the control unit 11 may obtain the motion program 50 from another storage device as appropriate. In some embodiments, the robot device 2 may include a sub-controller that may store the motion program 50. In this case, the control unit 11 may obtain the motion program 50 from the sub-controller included in the robot device 2.

Upon completion of obtaining the motion program 50, the control unit 11 advances the processing to subsequent step S102.

Step S102

In step S102, the control unit 11 operates as the change receiver 112 to receive a request for a component change to change at least one of the multiple components included in the product 3.

The request for the component change may be received through any interface appropriately designed in each embodiment to identify the first component as the target of the component change and the second component to replace the first component. For example, the control unit 11 may receive a request for a component change as an indication of the first component and an indication of the second component received through the input device 14. The first component and the second component may be indicated using text input. In another example, the control unit 11 may output a list of components (components 31 to 33 in the above specific example) of the product 3 to the output device 15 and receive an indication of the first component with the output list. The list of components included in the product 3 may be prestored in a storage area such as the storage 12, or may be extracted from the motion program 50 as appropriate. The control unit 11 may then output a list of components of the same type as the indicated first component to the output device 15 and receive an indication of the second component with the output list. The list of components of the same type as the first component may be prestored in a storage area or extracted from the attribute information 121.

Upon completion of receiving a request for a component change, the control unit 11 advances the processing to subsequent step S103. The processing in step S102 is not limited to the above example. When no motion program 50 is used to generate the list of components included in the product 3, the processing in step S102 may be performed in parallel with or before the processing in step S101.

Step S103

In step S103, the control unit 11 operates as the index determiner 118 to determine whether the reference point of the geometric model for the first component and the reference point of the geometric model for the second component are defined using the same index.

A method of determining whether the same index is used for defining the reference points may be determined as appropriate in each embodiment. In an example, the control unit 11 may first obtain information indicating the index used for defining the reference point of the geometric model for each component (hereafter also referred to as index information). In the example of FIG. 7, the reference point 317 of the geometric model 310 representing the component 31 is at the center of the component 31. The reference point 357 of the geometric model 350 representing the component 35 is at a corner of the component 35. The index used for the reference point of the geometric model for each component can be estimated based on the positional relationship of the reference point with the shape of the geometric model, or specifically, for example, the reference point being at a predetermined fixed point (e.g., the center, the center of gravity, or an edge). The control unit 11 may thus refer to the attribute information 121 and estimate the index used for the reference point of the geometric model for each component based on the positional relationship of the reference point with the shape of the geometric model for each component. The control unit 11 may obtain index information based on the estimation result. The index information may be prestored in a storage area. In this case, the control unit 11 may obtain the index information from the storage area. The control unit 11 may then compare the indexes used for the reference points of the geometric models for the first component and the second component based on the index information. The comparison results may then be used by the control unit 11 to determine whether the reference points of the geometric models for the first component and the second component are defined using the same index.

Upon completion of determining whether the reference points of the geometric models for the first component and the second component are defined using with the same index, the control unit 11 advances the processing to subsequent step S104.

Step S104

In step S104, the control unit 11 determines a branch destination of the processing based on the determination result in step S103. In step S103, when determining that the reference points of the geometric models for the first component and the second component are defined using the same index, the control unit 11 advances the processing to subsequent step S106 without performing the processing in step S105. When determining that the reference points of the geometric models for the first component and the second component are not defined using the same index, the control unit 11 advances the processing to subsequent step S105.

Step S105

In step S105, the control unit 11 operates as the coordinate corrector 119 to correct the reference point of the geometric model for the second component to be defined using the same index as the reference point of the geometric model for the first component.

In the present embodiment, the control unit 11 corrects the reference point of the geometric model for the second component by shifting the reference point for the second component to a predetermined fixed point corresponding to the index used for the reference point of the geometric model for the first component. In the example of FIG. 7, the control unit 11 corrects the position of the reference point 357 to cause the reference point 357 to be at the center of the component 35. When the local coordinate systems used for the first component and the second component have different inclinations, the control unit 11 may correct the inclination of the local coordinate system used for the second component to match the inclination of the local coordinate system used for the first component.

Upon completion of correcting the reference point of the geometric model for the second component, the control unit 11 advances the processing to subsequent step S106. The processing in steps S103 to S105 may be performed in any order different from this example. The processing in steps S103 to S105 may be performed at a selected time before the processing in step S107 (described later) is performed. The control unit 11 may use, instead of the second component indicated as a component to replace the first component, each component of the product 3 before the component change as a pseudo first component, and may correct the reference point of the geometric model for each component that can be replaced with the pseudo first component. In this case, the processing in steps S103 to S105 may be performed in parallel with or before the processing in step S102.

Step S106

In step S106, the control unit 11 operates as the motion extractor 113 to refer to the attribute information 121 and compare the attributes of the first component with the attributes of the second component. Based on the comparison results, the control unit 11 extracts, from the series of motions defined in the motion program 50, any motion to be corrected based on the difference in attribute between the first component and the second component.

In an example, the control unit 11 first identifies, among multiple components included in a product 3, a third component affected by the component change. The third component has dependency on the first component and is thus affected by the component change. The dependency between such components may occur when multiple components are arranged in layers or structurally in the product 3. An example of such dependency is the placement of a component on a target component to be changed, as seen between the components (32, 33) in the above specific example. A component has dependency on the first component when its target state (e.g., its placement position or orientation) in the product 3 is changeable in the assembly after the target component is changed.

The third component having dependency on the first component may be identified as appropriate. For example, the attribute information 121 may include information indicating dependency between the components (hereafter also referred to as dependency information). In this case, the control unit 11 can refer to the attribute information 121 to obtain the dependency information. The control unit 11 may identify the third component among the multiple components included in the product 3 by referring to the dependency information. The dependency information may be prestored in a storage area such as the storage 12 as a separate file from the attribute information 121. In this case, the control unit 11 may obtain the dependency information from the storage area. The control unit 11 may identify the third component with dependency on the first component in the motion program 50 with a known analysis method such as dependency analysis.

The control unit 11 identifies one or more motions associated with the first component or the identified third component among the series of motions defined in the motion program 50. The control unit 11 refers to the attribute information 121 and compares the attributes of the first component with the attributes of the second component to obtain any attribute value to be changed. The control unit 11 extracts, from one or more identified motions, a motion associated with the attribute value to be changed (in other words, a motion to be corrected based on the difference in attribute between the first component and the second component).

The motion to be corrected may be identified in accordance with the type of attribute that differs between the first component and the second component. In an example, the correspondence between the motion to be corrected and the type of attribute that differs between the components may be provided based on certain rules. The control unit 11 can identify the motion to be corrected in accordance with the type of attribute that differs between the first component and the second component by referring to information indicating the correspondence. The information indicating the correspondence may be prestored in a storage area such as the storage 12.

In the present embodiment, the attribute information 121 includes information about the geometric attributes of the components. In the processing performed in step S106, the control unit 11 can extract the geometric motions associated with the first component or the third component in accordance with the difference in geometric attribute between the first component and the second component. In the above specific example, motions to be corrected are extracted from motions associated with the component 31 through this process. Such motions to be corrected are the motion of gripping the component 31 with the gripper 25, the motion of transporting the component 31 to the target position with the gripper 25, and the motion of transporting each component (32, 33) to its target position with the gripper 25. When the feeding position of the component 35 is different from the feeding position of the component 31, the motion of moving the gripper 25 to the feeding position of the component 31 is further extracted as a motion to be corrected.

The attribute information 121 may further include information about weight. In the processing in step S106, the control unit 11 can extract motions that are affected by attributes other than geometric attributes, such as the motion of transporting the first component to its target position.

A motion to be corrected may be extracted with a method other than the method in this example. For an example other method simplifying the processing, the control unit 11 may eliminate the processing associated with the third component and simply extract a motion associated with the first component to be replaced with the second component.

Upon completion of extracting the motion to be corrected, the control unit 11 advances the processing to subsequent step S107.

Step S107

In step S107, the control unit 11 operates as the command corrector 114 to correct the command value of the extracted motion in the motion program 50 to compensate for the difference in attribute between the first component and the second component.

In the present embodiment, the control unit 11 corrects the command value of the extracted motion in accordance with the difference in attribute value between the first component and the second component. As described above, the difference in attribute value between the first component and the second component may be used directly as a correction value. In some embodiments, the correction value may be derived from the difference in attribute value between the first component and the second component in accordance with a predetermined rule. The predetermined rule may be provided based on certain rules or using a computational expression such as a function. In the present embodiment, the attribute information 121 includes information about the geometric attributes of the components. In step S107, the control unit 11 can correct the command values for the geometric motions of the robot device 2, such as the opening width and the closing width of the gripper 25 and the target positions of the components 31 to 33 in the above specific example. The attribute information 121 may further include information about weight. In the processing in step S107, the control unit 11 can extract motions that are affected by attributes other than geometric attributes, such as a torque amount for the gripper 25 for transporting the first component.

This allows the control unit 11 to generate a temporary motion program with the corrected command value of the extracted motion. Upon completion of generating the temporary motion program by correcting any extracted command value, the control unit 11 advances the processing to subsequent step S108.

Step S108

In step S108, the control unit 11 uses the generated temporary motion program to simulate the series of motions of the robot device 2 in an assembly operation performed after the component change.

The motions may be simulated with any method. The simulation may be performed using known software. For example, the control unit 11 may simulate, in the virtual space created in the world coordinate system, each of the processes included in an assembly operation of the product 3 defined by the temporary motion program based on the attribute information 121, the specification information 123, and the robot information 125. Through this simulation process, the control unit 11 may simulate the series of motions of the robot device 2.

An environment in which an assembly operation is performed may include elements other than the components of the product 3, such as obstacles. The simulation may further reflect such other elements. Information about such other elements (hereafter also referred to as environmental information) may be obtained as appropriate. The environmental information may be prestored in a storage area such as the storage 12. The control unit 11 may obtain the environmental information from the storage area. Similarly to the attribute information 121 and other information, the environmental information may include geometric models for other elements such as obstacles.

The simulation in step S108 allows determination as to whether a motion failure is to occur when the generated temporary motion program is executed. This allows early detection of an unexpected failure that cannot be removed by simply correcting the command value of a motion associated with a component change. This improves the reliability of the generated motion program. Upon completion of the simulation for the series of motions included in the assembly operation, the control unit 11 advances the processing to subsequent step S109.

Step S109

In step S109, the control unit 11 operates as a determination unit (not shown) to determine whether the simulation in step S108 shows a failure (problem) in any motion of the robot device 2. When determining that the simulation shows a failure in the motion of the robot device 2, the control unit 11 advances the processing to step S110. When determining that the simulation shows no failure, the control unit 11 advances the processing to step S116.

A typical example failure detected by the simulation is a failure of the specifications of the target tool (first tool) to respond to a component change, or a failure of the specifications of the target tool specification to fit the attributes of the second component. Another example failure is interference of a component with another object, such as an obstacle or another component, during an operation associated with the component due to a change in the positional relationship between the components resulting from any component change. A specific example of such interference occurs when the second component is taller than the first component, and an adjacent component is placed with the gripper at a position away from the feeding position beyond the second component. In this case, the path for transporting the adjacent component with the gripper may be obstructed by the second component. Such an obstructed transportation path is an example of the interference. When detecting such a failure, the control unit 11 advances the processing to step S110. Interference with another component among other objects may be detected in step S106 above. In this case, the control unit 11 may use, as a third component, a component associated with an operation that can interfere with another object. In step S107, the control unit 11 may correct the command value of a motion associated with the component to avoid interference with another component.

Step S110

In step S110, the control unit 11 operates as the specification determiner 116 to refer to the specification information 123 and determine whether the specifications of the target tool (first tool) can respond to the component change from the first component to the second component.

The specifications of the target tool responding to the component change refer to the specifications of the target tool allowing a difference in attribute between the first component and the second component, or in other words, the specifications of the target tool satisfying the conditions for performing the same operation on the second component as on the first component with the corrected command value.

The control unit 11 refers to the attribute information 121 and the specification information 123 and compares the attributes of the second component with the specifications of the target tool. The comparison results may be used by the control unit 11 to determine whether the specifications of the target tool satisfy the conditions for performing an operation on the second component, or specifically, whether the specifications of the target tool can respond to the component change from the first component to the second component.

In the above specific example, the specification information 123 may include, for example, information about the maximum opening width, the minimum opening width, the weight capacity, the opening speed, and the gripping torque of the gripper 25. In this case, the control unit 11 may compare the maximum opening width and the minimum opening width of the gripper 25 with the dimensions of the component 35 to determine whether the component 35 can be transported by the gripper 25. The component 35 has dimensions less than or equal to the maximum opening width and greater than or equal to the minimum opening width and thus can be gripped by the gripper 25. The control unit 11 determines that the specifications of the target tool can respond to the component change from the first component to the second component. The component 35 has dimensions greater than the maximum opening width or less than the minimum opening width and thus cannot be gripped by the gripper 25. The control unit 11 determines that the specifications of the target tool cannot respond to the component change from the first component to the second component. The control unit 11 may compare the weight capacity of the gripper 25 with the weight of the component 35 to determine whether the component 35 can be transported by the gripper 25. When the weight of the component 35 is less than or equal to the weight capacity, the control unit 11 determines that the specifications of the target tool can respond to the component change from the first component to the second component. When the weight of the component 35 exceeds the weight capacity, the control unit 11 determines that the specifications of the target tool cannot respond to the component change from the first component to the second component. The comparisons are mere examples, and the types of specifications and attributes to be compared in determining whether the specifications or the attributes can respond to the component change may be selected as appropriate in each embodiment.

Upon completion of determining whether the specifications of the target tool can respond to the component change, the control unit 11 advances the processing to subsequent step S111.

Step S111

In step S111, the control unit 11 determines a branch destination of the processing based on the determination result in step S110. When determining that the specifications of the target tool can respond to the component change from the first component to the second component in step S110, the control unit 11 advances the processing to step S115. When determining that the specifications of the target tool cannot respond to the component change, the control unit 11 advances the processing to step S112.

Step S112

In step S112, the control unit 11 operates as the tool extractor 117 to refer to the specification information 123 and extract, from multiple tools, a tool of the same type as the target tool and having the specifications that can respond to the component change. The extracted tool is an example of a second tool.

In the present embodiment, the control unit 11 refers to the specification information 123 to extract the tool of the same type as the target tool and having the specifications that satisfy the conditions for performing the same operation on the second component as on the first component. In the above specific example, when the determination result shows that the component 35 cannot be gripped by the gripper 25, the control unit 11 extracts, from multiple grippers indicated by the specification information 123, a gripper that can grip the component 35. When the determination result shows that the component 35 cannot be transported by the gripper 25, the control unit 11 extracts, from multiple grippers indicated by the specification information 123, a gripper having the weight capacity of greater than or equal to the weight of the component 35 to transport the component 35.

Upon completion of extracting the tool with the specifications that can respond to the component change, the control unit 11 advances the processing to subsequent step S113.

Steps S113 and S114

In step S113, the control unit 11 changes the tool to be used for the target component from the target tool to the extracted tool. In step S112 above, multiple tools that can respond to the component change may be extracted. In this case, the control unit 11 may thus select the tool to be used for the target component from the extracted multiple tools as appropriate. In an example, the specification information 123 may include information about the priority of each tool to be used. In this case, the control unit 11 may select a tool to be used for the target component based on the priority assigned to each tool. In another example, the control unit 11 may output information about the extracted multiple tools to the output device 15 and receive, through the input device 14, an indication of a tool to be used for the target component from the multiple tools. In this case, the control unit 11 may select a tool to be used for the target component based on an indication from an operator.

In step S114, the control unit 11 operates as the command corrector 114 to correct the command value of the extracted motion in the motion program 50 to further compensate for the change from the target tool to the extracted tool. In other words, the control unit 11 corrects the command value of the motion associated with the target tool to respond to the extracted tool. As an example correction method, a rule for the correction may be provided based on certain rules. In this case, information indicating the rule for correction (hereafter referred to as correction rule information) may be prestored in a storage area such as the storage 12. The control unit 11 obtains the correction rule information from the storage area. The control unit 11 corrects the command value of the motion associated with the target tool to respond to the extracted tool based on the correction rule information. The correction rule information may include, for example, information about the correspondence between parameters associated with the multiple tools, such as functions and variables. In this case, the control unit 11 may further correct the parameters used in the motion program 50 based on the correspondence.

This allows generation of a new temporary motion program by further correcting the command values in the motion program 50, or in other words, by correcting the command values included in the temporary motion program obtained before the processing in step S114. Upon completion of generating the new temporary motion program, the control unit 11 returns the processing to step S108. The control unit 11 then repeats the processing from the simulation of a motion using the new temporary motion program. The processing in steps S110 to S114 may be performed in any order different from this example. The processing in steps S110 to S114 may be performed before the processing in step S108.

Step S115

In step S115, the control unit 11 operates as the command corrector 114 to further correct the command values included in the motion program 50 to eliminate any failure (problem) detected through the simulation.

A failure other than any failure resulting from the specifications of the above target tool is to be corrected in step S115. As descried above, an example failure to be corrected is a failure caused by the interference with another object. As an example correction method, similarly to step S114 above, a rule for the correction to eliminate failures may be provided based on certain rules. The rule for the correction may be provided as appropriate to avoid interference with another object, for example, changing the path for transporting the gripper 25, or changing the orientation of the gripper 25 gripping or releasing each component. A change in each command value may be determined as appropriate. In this case, the control unit 11 may further correct the command values included in the motion program 50 to eliminate any detected failure based on the rule for correction.

When automatically correcting command values is difficult, the control unit 11 may output information about a motion involving a failure to the output device 15 and receive corrected command values included in the motion program 50 through the input device 14. In this case, the control unit 11 may further correct command values included in the motion program 50 in response to an operator input.

This allows generation of a new temporary motion program by further correcting the command values included in the motion program 50, or in other words, by correcting the command values included in the temporary motion program obtained before the processing in step S115. Upon completion of generating the new temporary motion program, the control unit 11 returns the processing to step S108. The control unit 11 then repeats the processing from the simulation of a motion using the new temporary motion program.

The correction process from steps S110 to S114 or steps S110, S111, and S115 may be repeated during the simulation in step S108 in which a motion failure is detected. In the simulation in step S108, the temporary motion program resulting when no more failure in the motion is detected is produced as the new motion program 55. The number of times the correction process is repeated may be defined as appropriate. In this case, the control unit 11 may stop the processing for the example motion once the number of times the correction process is repeated exceeds a specified number, and may output the generated temporary motion program at that moment through the output device 15, and may also notify the operator (user) of any motion that can cause a failure.

Step S116

In step S116, the control unit 11 operates as the storing unit (not shown) to store the generated new motion program 55 into a predetermined storage area. The predetermined storage area may be, for example, the RAM in the control unit 11, the storage 12, an external storage, a storage medium, or a combination of these. The new motion program 55 may overwrite the original motion program 50, or may be stored in a separate file from the original motion program 50.

Upon completion of storing the new motion program 55, the control unit 11 ends the procedure associated with the example motion.

Features

As described above, the structure according to the present embodiment can automatically generate, in response to a request for a component change through the processing in steps S101, S102, S106, and S107, a new motion program 55 by correcting command values included in the motion program 50. The generated new motion program 55 includes command values for motions that are affected by the component change corrected through the processing in steps S106 and S107 to match the attributes of the replacement second component. The generated new motion program 55 thus allows the assembly operation of the product 3 to be performed appropriately after the component change from the first component to the second component. The structure according to the present embodiment reduces, for any change in at least one component included in the product 3, the time and labor to generate a new motion program 55 usable in an assembly operation performed after the component change. Further, the controller 1 according to the present embodiment allows a relatively inexperienced person to generate a new motion program in response to a component change.

The structure according to the present embodiment allows, through the processing in steps S103 to S105, the reference points of the geometric models for the first component and the second component to be defined using the same index when the new motion program 55 is generated through the processing subsequent to step S106. This thus prevents a motion failure from occurring due to the different indexes used for the reference points of the geometric models when the new motion program 55 is executed. The structure can reduce the time and labor to generate a new motion program 55 usable in an assembly operation performed after the component change by automating the operation of adjusting the reference point of the geometric model for each component.

Through the processing in step S110, the structure according to the present embodiment determines whether a failure is to occur in any motion due to the specifications of the target tool for the component to be changed, thus improving the reliability of the generated motion program 55. When a failure is to occur in any motion due to the specifications of a tool used for a component to be changed, an appropriate tool for replacement (second tool) can be automatically extracted through the processing in step S112. This reduces the time and labor to correct the generated motion program. The processing in step S114 can further reduce the time and labor to generate a new motion program 55 by automating any operation associated with the tool change.

The attribute information 121 including information about the geometric attributes of the components allows, in step S107 above, automatic generation of the new motion program 55 corresponding to any change in the geometric attributes of the target component resulting from the replacement of the first component with the second component. The attribute information 121 further including information about weight allows, in step S107 above, automatic generation of the new motion program corresponding to any change in an attribute other than the geometric attributes of the target component resulting from the replacement of the first component with the second component.

4. Modifications

The embodiment of the present invention described in detail above is a mere example of the present invention in all aspects. The embodiment may be variously modified or altered without departing from the scope of the present invention. For example, the embodiment may be modified in the following forms. The same components as those in the above embodiment are hereafter given like numerals, and the operations that are the same as those in the above embodiment will not be described. The modifications described below may be combined as appropriate.

4.1

The processing in steps S113 and S114 may be eliminated from the procedure in the above embodiment. In this case, the control unit 11 may output information about any tool extracted through the processing in step S112 to the output device 15 and receive correction of the temporary motion program through the input device 14. The control unit 11 may correct the command value of the motion associated with the target tool to respond to the extracted tool in response to an operator input.

The processing in step S112 may further be eliminated from the procedure in the above embodiment. In this case, the tool extractor 117 may be eliminated from the software configuration of the controller 1. After the processing in step S111, the control unit 11 may output information indicating that the target tool cannot respond to the component change through the output device 15 and may receive an indication of a tool for replacement through the input device 14. In this case, the control unit 11 may select the tool to be used for an operation associated with the second component, instead of the target tool, based on an indication from an operator.

The processing in steps S110 and S111 may be eliminated from the procedure in the above embodiment. In this case, the specification determiner 116 may be eliminated from the software configuration of the controller 1. The command value of any motion associated with the tool may be corrected by, for example, a manual operation performed by an operator.

4.2

The processing in steps S103 to S105 may be eliminated from the procedure in the above embodiment. In this case, the index determiner 118 and the coordinate corrector 119 may be eliminated from the software configuration of the controller 1. The reference point of the geometric model for each component may be corrected by, for example, a manual operation performed by an operator.

4.3

The processing in steps S108, S109, and S115 may be eliminated from the procedure in the above embodiment. In this case, the simulator 115 may be eliminated from the software configuration of the controller 1. The reliability of the generated new motion program 55 may be determined as appropriate by a manual operation performed by an operator or by using other software.

4.4

In the above embodiment, the component to be changed (first component) may not be a single component. Multiple components may be changed. Each of the first component and the second component may include multiple sub-components. Each of the first component and the second component may include a different number of sub-components.

In step S105, the control unit 11 may correct, instead of the reference point of the geometric model for the second component, the reference point of the geometric model for the first component to be defined using the same index as the reference point for the second component. In this case, the control unit 11 may further correct the command value of any motion associated with the first component in the motion program 50 in response to the reference point of the geometric model for the first component being corrected.

The controller 1 according to the above embodiment can perform the information processing for controlling the motion of the robot device 2 and for generating a new motion program 55 in response to a request for a component change. However, the program generation apparatus may have any other structure. The information processing to control the motion of the robot device 2 may be eliminated.

Figure 9:
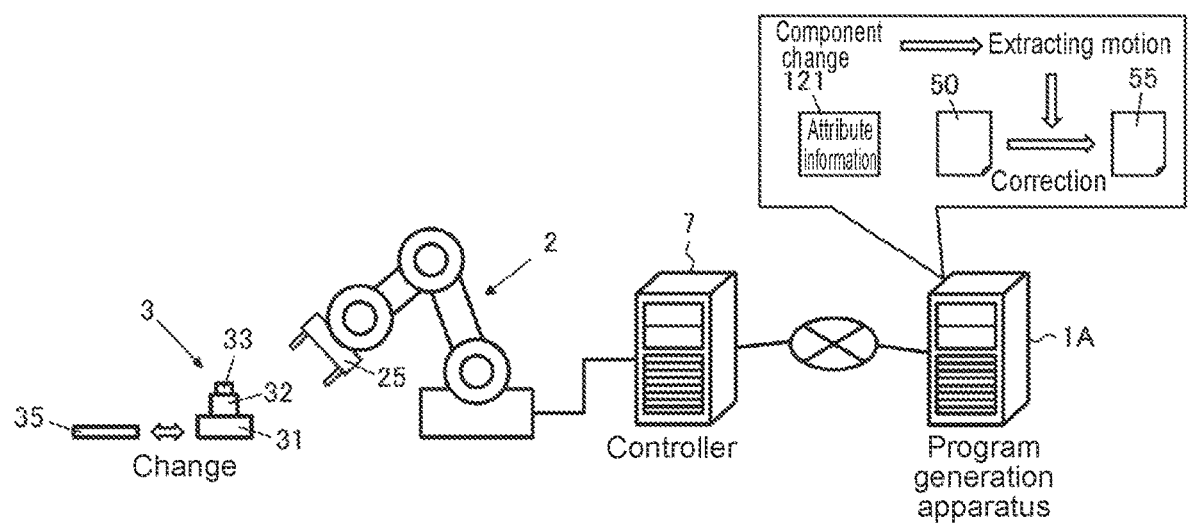
FIG. 9 is a schematic diagram illustrating another example situation in which one or more embodiments may be used.

FIG. 9 is a schematic diagram of another example situation in which an embodiment of the present invention is used. In the example of FIG. 9, a controller 7 is connected to the robot device 2 to control the motion of the robot device 2. The hardware configuration of the controller 7 may be the same as the controller 1 described above. A program generation apparatus 1A generates a new motion program 55 in response to a request for a component change. The program generation apparatus 1A may have the same hardware and software configurations as the controller 1 described above. In this manner, the information processing for controlling the motion of the robot device 2 and the information processing for generating the new motion program 55 may be performed by separate computers.

As shown in FIG. 9, the program generation apparatus 1A and the controller 7 may be connected to each other with a network. The network may be selected as appropriate from, for example, the Internet, a wireless communication network, a mobile communication network, a telephone network, and a dedicated network. In this case, the program generation apparatus 1A and the controller 7 each further include a network interface. This allows various sets of data (e.g., the motion program 50 before being changed, or the motion program 55 after being changed) to be communicated between the program generation apparatus 1A and the controller 7. However, such data may be communicated between the program generation apparatus 1A and the controller 7 with any method other than the example method described above. For example, data may be communicated between the program generation apparatus 1A and the controller 7 using a storage medium.

REFERENCE SIGNS LIST

1 controller
11 control unit
12 storage
13 external interface
14 input device
15 output device
16 drive
111 data obtainer
112 change receiver
113 motion extractor
114 command corrector
115 simulator
116 specification determiner
117 tool extractor
118 index determiner
119 coordinate corrector
50 motion program (before change)
55 motion program (after change)
121 attribute information
123 specification information
125 robot information
81 generation program
91 storage medium
2 robot device
210 base
211 to 216 joint
221 to 224 link
25 gripper (tool)
3 product
31 component (first component)
32, 33 component
35 component (second component)
310, 350 geometric model
315, 355 local coordinate system
317, 357 reference point

The invention claimed is:

1. A program generation apparatus, comprising a processor configured with a program to perform operations comprising:

creating a series of motions comprised in an assembly operation affected by a component change, during a simulation in which operations for program generation are conducted, the simulation comprising a virtual space into which an operating state of a robot device in a real space is projected;

obtaining, during the simulation, a motion program to instruct the robot device to perform a series of motions comprised in an assembly operation to assemble a product using a plurality of components;

receiving, during the simulation, a request for a component change to change at least one of the plurality of components in order to perform the assembly operation;

referring, during the simulation, to attribute information indicating an attribute of each of the plurality of components, comparing an attribute of a first component indicated as a target of the component change and an attribute of a second component to replace the first component in the component change to determine a difference in the attribute of the first component and the attribute of the second component, and extracting, from the series of motions defined in the motion program, a motion or motions of the robot device to be corrected based on the difference in the attribute between the first component and the second component in order to perform the assembly operation; and generating, during the simulation, a new motion program to instruct the robot device to perform the series of motions comprised in the assembly operation performed after the component change by correcting a command value of the extracted motion in the motion program to compensate for the difference in attribute between the first component and the second component, wherein the command value to be corrected is associated with a geometric motion of the robot device, the attribute information comprises a shape, a dimension, a position, and a geometric model for each of the plurality of components, the geometric model represents the shape and the dimension being defined for each of the plurality of components in a local coordinate system having a reference point as an origin, and the processor configured with the program to perform operations further comprising determining, during the simulation, whether a reference point of a geometric model for the first component and a reference point of a geometric model for the second component are defined using a same index, and correcting, during the simulation, the reference point of the geometric model for the second component to be defined using the same index as the reference point of the geometric model for the first component before the command value of the motion is corrected when it is determined that the reference point of the first component and the reference point of the second component are not defined using the same index.

2. The program generation apparatus according to claim 1, wherein
the robot device comprises a first tool usable in an operation associated with the first component comprised in the assembly operation, and
the processor is configured with the program to perform operations further comprising referring, during the simulation, to specification information indicating specifications of a plurality of tools comprising the first tool and determine whether a specification of the first tool responds to the corrected command value in the generated new motion program based on the component change from the first component to the second component.

3. The program generation apparatus according to claim 2, the processor is configured with the program to perform operation further comprising:
referring, during the simulation, to the specification information and extracting, from the plurality of tools, a second tool of a same type as the first tool and having a specification to respond to the component change when it is determined that the specification of the first tool does not respond to the component change.

4. The program generation apparatus according to claim 3,
wherein the processor is configured with the program to perform operations such that generating a new motion program comprises generating, during the simulation, a new motion program to instruct the robot device to perform a series of motions comprised in an assembly operation performed after the component change by correcting a command value of the extracted motion in the motion program to further compensate for a change from the first tool to the second tool.

5. The program generation apparatus according to claim 4, wherein
the attribute comprises a shape, a dimension, and a position, and
the command value to be corrected is associated with a geometric motion of the robot device.

6. The program generation apparatus according to claim 4, the processor configured with the program to perform operations further comprising:
simulating, during the simulation, using the generated new motion program, a series of motions of the robot device in an assembly operation to be performed after the component change.

7. The program generation apparatus according to claim 3, wherein
the attribute comprises a shape, a dimension, and a position, and
the command value to be corrected is associated with a geometric motion of the robot device.

8. The program generation apparatus according to claim 3, the processor configured with the program to perform operations further comprising:
simulating, during the simulation, using the generated new motion program, a series of motions of the robot device in an assembly operation to be performed after the component change.

9. The program generation apparatus according to claim 2, wherein
the attribute comprises a shape, a dimension, and a position, and
the command value to be corrected is associated with a geometric motion of the robot device.

10. The program generation apparatus according to claim 2, the processor configured with the program to perform operations further comprising:
simulating, during the simulation, using the generated new motion program, a series of motions of the robot device in an assembly operation to be performed after the component change.

11. The program generation apparatus according to claim 1, wherein
the attribute further comprises a weight.

12. The program generation apparatus according to claim 1, the processor configured with the program to perform operations further comprising:
simulating, during the simulation, using the generated new motion program, a series of motions of the robot device in an assembly operation to be performed after the component change.

13. The program generation apparatus according to claim 1, wherein
the processor is configured with the program to perform operations such that extracting the motion to be corrected comprises, during the simulation,
identifying, among the plurality of components, a third component to be affected by the component change,
identifying, among the series of motions, at least one motion associated with the first component or the third component being identified, and
extracting, from the at least one motion being identified, a motion to be corrected based on a difference in attribute between the first component and the second component.

14. The program generation apparatus according to claim 1, wherein
the attribute further comprises a weight.

15. The program generation apparatus according to claim 1, the processor configured with the program to perform operations further comprising:
simulating, during the simulation, using the generated new motion program, a series of motions of the robot device in an assembly operation to be performed after the component change.

16. A program generation method implementable by a computer, the method comprising:
creating a series of motions comprised in an assembly operation affected by a component change, during a simulation in which program generation is conducted, the simulation comprising a virtual space into which an operating state of a robot device in a real space is projected;
obtaining, during the simulation, a motion program to instruct the robot device to perform a series of motions comprised in an assembly operation to assemble a product using a plurality of components;
receiving, during the simulation, a request for a component change to change at least one of the plurality of components in order to perform the assembly operation;

referring, during the simulation, to attribute information indicating an attribute of each of the plurality of components, comparing, during the simulation, an attribute of a first component indicated as a target of the component change and an attribute of a second component to replace the first component in the component change, and extracting, during the simulation, from the series of motions defined in the motion program, a motion to be corrected based on a difference in attribute between the first component and the second component in order to perform the assembly operation; and generating, during the simulation, a new motion program to instruct the robot device to perform a series of motions comprised in an assembly operation performed after the component change by correcting a command value of the extracted motion in the motion program to compensate for the difference in attribute between the first component and the second component, wherein the command value to be corrected is associated with a geometric motion of the robot device, the attribute information comprises a shape, a dimension, a position, and a geometric model for each of the plurality of components, the geometric model represents the shape and the dimension being defined for each of the plurality of components in a local coordinate system having a reference point as an origin, and the method further comprises determining, during the simulation, whether a reference point of a geometric model for the first component and a reference point of a geometric model for the second component are defined using a same index, and correcting, during the simulation, the reference point of the geometric model for the second component to be defined using the same index as the reference point of the geometric model for the first component before the command value of the motion is corrected when it is determined that the reference point of the first component and the reference point of the second component are not defined using the same index.

17. A non-transitory computer-readable storage medium storing a generation program, which when read and executed, causes a computer to perform operations comprising:

creating a series of motions comprised in an assembly operation affected by a component change, during a simulation in which program generation is conducted, the simulation comprising a virtual space into which an operating state of a robot device in a real space is projected;

obtaining, during the simulation, a motion program to instruct the robot device to perform a series of motions comprised in an assembly operation to assemble a product using a plurality of components;

receiving, during the simulation, a request for a component change to change at least one of the plurality of components in order to perform the assembly operation;

referring, during the simulation, to attribute information indicating an attribute of each of the plurality of components, comparing, during the simulation, an attribute of a first component indicated as a target of the component change and an attribute of a second component to replace the first component in the component change, and extracting, during the simulation, from the series of motions defined in the motion program, a motion to be corrected based on a difference in attribute between the first component and the second component in order to perform the assembly operation; and generating, during the simulation, a new motion program to instruct the robot device to perform a series of motions comprised in an assembly operation performed after the component change by correcting a command value of the extracted motion in the motion program to compensate for the difference in attribute between the first component and the second component, wherein the command value to be corrected is associated with a geometric motion of the robot device, the attribute information comprises a shape, a dimension, a position, and a geometric model for each of the plurality of components, the geometric model represents the shape and the dimension being defined for each of the plurality of components in a local coordinate system having a reference point as an origin, and the operations further comprise determining, during the simulation, whether a reference point of a geometric model for the first component and a reference point of a geometric model for the second component are defined using a same index, and correcting, during the simulation, the reference point of the geometric model for the second component to be defined using the same index as the reference point of the geometric model for the first component before the command value of the motion is corrected when it is determined that the reference point of the first component and the reference point of the second component are not defined using the same index.

* * * * *